(12) United States Patent
Yoshida et al.

(10) Patent No.: US 6,914,620 B2
(45) Date of Patent: Jul. 5, 2005

(54) MULTI-BEAM SCANNING OPTICAL SYSTEM AND IMAGE FORMING APPARATUS USING THE SAME

(75) Inventors: Hiroki Yoshida, Tochigi (JP); Yoshihiro Ishibe, Tochigi (JP); Keiichiro Ishihara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 10/180,079

(22) Filed: Jun. 27, 2002

(65) Prior Publication Data

US 2003/0001944 A1 Jan. 2, 2003

(30) Foreign Application Priority Data

Jun. 29, 2001 (JP) ........................................ 2001-198263

(51) Int. Cl.[7] .................................................. B41J 2/47
(52) U.S. Cl. ....................................................... 347/235
(58) Field of Search ................................. 347/235, 241, 347/250, 256; 359/204

(56) References Cited

U.S. PATENT DOCUMENTS

| | | | | |
|---|---|---|---|---|
| 5,963,356 A | * | 10/1999 | Kato | ........................... 359/216 |
| 6,317,244 B1 | | 11/2001 | Ishibe | ........................... 359/204 |
| 6,476,955 B1 | * | 11/2002 | Yoshida | ........................... 359/204 |
| 6,489,982 B2 | | 12/2002 | Ishibe | ........................... 347/134 |

FOREIGN PATENT DOCUMENTS

| | | | | |
|---|---|---|---|---|
| EP | 1 011 003 A2 | * | 6/2000 | ........... G02B/26/12 |
| EP | 1 107 038 A2 | * | 6/2001 | ........... G02B/26/12 |
| JP | 9-54263 | | 2/1997 | |
| JP | 2000-235154 | | 8/2000 | |

* cited by examiner

*Primary Examiner*—Lamson Nguyen
*Assistant Examiner*—Blaise Mouttet
(74) *Attorney, Agent, or Firm*—Fitzpatrick, Cella, Harper & Scinto

(57) ABSTRACT

It is an object of the present invention to provide a multi-beam scanning optical system, which can reduce relative deviation of a writing position of each light-emitting portion due to focus deviation of a synchronization detection optical device, and an image forming apparatus using the same. In the multi-beam scanning optical system having the synchronization detection optical device including a light source device, an incident optical device, a deflection device, a scanning optical device and a slit, each element is set such that relative deviation of a writing position of each light beam due to deviation of a focus position within a main scanning cross section is reduced by a first light beam limiting element provided between the deflection device and the slit and a conditional expression is satisfied.

20 Claims, 14 Drawing Sheets

ARROWS SHOW TRAVELLING DIRECTIONS
OF LIGHT BEAMS

ARROWS SHOW TRAVELLING DIRECTIONS
OF LIGHT BEAMS

MULTI-BEAM SCANNING OPTICAL SYSTEM AND IMAGE FORMING APPARATUS USING THE SAME

BACKGROUND OF THE INVENTION

1. Field of the Invention

The present invention relates to a multi-beam scanning optical system and an image forming apparatus using the same and, more particularly, to a multi-beam scanning optical system preferably used for an image forming apparatus such as a laser beam printer and a digital copying machine, which can perform high-speed and high-quality printing with a relatively simple structure.

2. Related Art

Conventionally, a scanning optical system, which is used in an image forming apparatus such as a laser beam printer and a digital copying machine, guides light beams emitted from a light source to deflection means by incident optical means and images the light beams deflected by the deflection means in a spot shape on a photosensitive drum surface, which is a surface to be scanned, thereby optically scanning the photosensitive drum surface with the light beams.

In recent years, there is a growing demand for the image forming apparatus with higher speed as the image forming apparatus realizes higher performance and higher functionality. In order to meet such a demand, use of a plurality of light sources has been examined. For example, Japanese Patent Application Laid-open No. 9-54263 proposes a multi-beam scanning optical system having a multi-beam laser chip, which emits aligned plurality of laser beams from one chip, as a light source.

In such a multi-beam scanning optical system, synchronization detection optical means (BD optical system) is generally provided immediately before a position where an image signal is written in order to accurately control a writing position of an image.

FIG. 15 is a main part sectional view in a main scanning direction (main scanning sectional view) of a conventional multi-beam scanning optical system. In the figure, reference numeral 51 denotes a light source unit, which has, for example, two light-emitting portions (light sources) consisting of a semiconductor laser. The two light-emitting portions are spaced apart from each other in a main scanning direction and a sub scanning direction. Reference numeral 52 denotes an aperture stop, which forms light beams emitted from each light-emitting portion in a desired optimal beam shape. Reference numeral 53 denotes a collimator lens, which converts the light beams that have passed through the aperture stop 52 into substantially parallel light beams. Reference numeral 54 denotes a cylindrical lens, which has a predetermined refracting power only in the sub scanning direction. Note that each of the aperture stop 52, the collimator lens 53, the cylindrical lens 54 and the like constitutes an element of incident optical means 62.

Reference numeral 55 denotes deflection means, which consists of, for example, a rotary polygon mirror and is rotated in an arrow A direction in the figure at a constant speed by driving means (not shown) such as a motor. Reference numeral 56 denotes scanning optical means having an fθ characteristic, which has two lenses, first and second fθ lenses. The scanning optical means 56 establishes an optically conjugate relationship between the vicinity of a deflection surface 55a of a light deflector 55 and the vicinity of a photosensitive drum surface 57 as a surface to be scanned within a sub scanning cross section, thereby realizing a toppling correcting function.

Reference numeral 58 denotes a return mirror (hereinafter referred to as "BD mirror"), which reflects a plurality of synchronization signal detection light beams ("BD light beams") for adjusting timing at a scanning start position on the photosensitive drum surface 57 toward a synchronization detection element 61 discussed below. Reference numeral 59 denotes a slit (hereinafter referred to as "BD slit"), which is disposed in a position equivalent to the photosensitive drum surface 57. Reference numeral 60 denotes a BD conjugate lens, which is for establishing a conjugate relationship between the BD mirror 58 and the synchronization detection element 61 and corrects surface toppling of the BD mirror 58. Reference numeral 61 denotes an optical sensor (hereinafter referred to as "BD sensor") as the synchronization detection element. Note that each of the return mirror 58, the BD slit 59, the BD conjugate lens 60, the BD sensor 61 and the like constitutes an element of the synchronization detection optical means (BD optical system).

In the figure, BD detection is performed for each BD light beam, and the timing at a scanning start position of image recording on the photosensitive drum surface 57 is adjusted for each BD light beam using an output from the BD sensor 61.

Incidentally, in the multi-beam scanning optical system with a plurality of light-emitting portions (light sources), an image to be printed is deteriorated if a relative writing position deviates for each of the light-emitting portions due to various reasons.

For example, Japanese Patent Application Laid-open No. 2000-235154 describes that it is a problem that a width of each light beam corresponding to each light-emitting portion is changed by the deflection means and, as a result, a difference in outputs of the BD sensor occurs to deviate a writing position.

However, a relative writing position may deviate even in a state in which a difference in outputs of the BD sensor corresponding to each light-emitting portion does not occur as described above. For example, a relative writing position deviates even in a case where a focus of the main scanning cross section of the BD light beams is out of position on the BD slit surface.

It is an object of the present invention to provide a multi-beam scanning optical system and an image forming apparatus using the same that can realize high-speed and high-quality printing by a relatively simple structure.

SUMMARY OF THE INVENTION

An object of the present invention is to provide a multi-beam scanning optical system comprising: light source means, incident optical means for guiding a plurality of light beams emitted from the light source means to deflection means, scanning optical means for imaging the plurality of light beams deflected by the deflection means on a surface to be scanned, and synchronization detection optical means in which the plurality of light beams deflected by the deflection means are condensed on a slit surface or a vicinity thereof by an optical element and then guided to a synchronization detection element, and timing of a scanning start on the surface to be scanned is controlled with respect to the plurality of light beams by using a signal from the synchronization detection element, wherein a first light beam limiting element is provided between the deflection means and the slit, and wherein the incident optical means has a second light beam limiting element and, given that a distance from the second light beam limiting element to a deflection point on the deflection means is d [mm], a maximum value of a distance in a main scanning direction between light-emitting portions of the plurality of light beams is w [mm], a focal length within a main scanning cross section of the incident optical means is fn [mm], and a focal length within a main scanning cross of the scanning optical means is fs [mm], satisfies a conditional expression (d·w)/(fn·fs)<0.003.

In the present invention, it is preferable that a light beam width in a main scanning direction of each light beam is determined by the first light beam limiting element at each instant when each light beam guided to the synchronization detection element is started to be incident on the synchronization detection element.

In the present invention, it is preferable that the first light beam limiting element is provided between the deflection means and the optical element for facilitating refraction or diffraction closest to the deflection means which is used in the synchronization detection optical means.

In the present invention, it is preferable that the first light beam limiting element is provided between the optical element for facilitating refraction or diffraction closest to the synchronization detection element which is used in the synchronization detection optical means and the slit.

An another object of the present invention is to provide a multi-beam scanning optical system comprising: light source means, incident optical means for guiding a plurality of light beams emitted from the light source means to deflection means, scanning optical means for imaging the plurality of light beams deflected by the deflection means on a surface to be scanned, and synchronization detection optical means in which the plurality of light beams deflected by the deflection means are condensed on a slit surface or a vicinity thereof by an optical element provided optically independently, from the scanning optical means and then guided to a synchronization detection element, and timing of a scanning start on the surface to be scanned is controlled with respect to the plurality of light beams by using a signal from the synchronization detection element, wherein a first light beam limiting element is provided between the deflection means and the slit, and wherein the incident optical means has a second light beam limiting element and, given that a distance from the second light beam limiting element to a deflection point on the deflection means is d [mm], a maximum value of a distance in a main scanning direction between light-emitting portions of the plurality of light beams is w [mm], a focal length within a main scanning cross section of the incident optical means is fn [mm], and a focal length within a main scanning cross of the scanning optical means is fs [mm], satisfies a conditional expression (d·w)/(fn·fs)<0.003.

In the present invention, it is preferable that the optical element provided in the incident optical means for facilitating an optical action only in a sub scanning direction and the optical element for facilitating refraction or diffraction provided in the synchronization detection optical means are integrated to form a composite optical element.

In the present invention, it is preferable that the first light beam limiting element and the second light beam limiting element are integrally provided.

In the present invention, it is preferable that the composite optical element is movable in a light axis direction of the synchronization detection optical means and adjusts a state of light beams within a sub scanning cross section on the surface to be scanned.

In the present invention, it is preferable that the first light beam limiting element is a mirror for guiding light beams to the synchronization detection element.

In the present invention, it is preferable that the first light beam limiting element is a mirror holding member that holds a mirror for guiding light beams to the synchronization detection element.

Further object of the present invention is to provide a multi-beam scanning optical system comprising: light source means, incident optical means for guiding a plurality of light beams emitted from the light source means to deflection means, scanning optical means for imaging the plurality of light beams deflected by the deflection means on a surface to be scanned, and synchronization detection optical means in which the plurality of light beams deflected by the deflection means are condensed on a light-receiving surface of a synchronization detection element or a vicinity thereof by an optical element and timing of a scanning start on the surface to be scanned is controlled with respect to the plurality of light beams by using a signal from the synchronization detection element, wherein a first light beam limiting element is provided between the deflection means and the light-receiving surface of the synchronization detection element, and wherein the incident optical means has a second light beam limiting element and, given that a distance from the second light beam limiting element to a deflection point on the deflection means is d [mm], a maximum value of a distance in a main scanning direction between light-emitting portions of the plurality of light beams is w [mm], a focal length within a main scanning cross section of the incident optical means is fn [mm], and a focal length within a main scanning cross of the scanning optical means is fs [mm], satisfies a conditional expression (d·w)/(fn·fs)<0.003.

In the present invention, it is preferable that the first light beam limiting element is provided between the optical element for facilitating refraction or diffraction closest to the synchronization detection element which is used in the synchronization detection optical means and the light-receiving surface.

Further object of the present invention is to provide a multi-beam scanning optical system comprising: light source means, incident optical means for guiding a plurality of light beams emitted from the light source means to deflection means, scanning optical means for imaging the plurality of light beams deflected by the deflection means on a surface to be scanned, and synchronization detection optical means in which the plurality of light beams deflected by the deflection means are condensed on a light-receiving surface of a synchronization detection element or a vicinity thereof by an optical element provided optically independently from the scanning optical means and timing of a scanning start on the surface to be scanned is controlled with respect to the plurality of light beams by using a signal from the synchronization detection element, wherein a first light beam limiting element is provided between the deflection means and the light-receiving surface of the synchronization detection element, and wherein the incident optical means has a second light beam limiting element and, given that a distance from the second light beam limiting element to a deflection point on the deflection means is d [mm], a maximum value of a distance in a main scanning direction between light-emitting portions of the plurality of light beams is w [mm], a focal length within a main scanning cross section of the incident optical means is fn [mm], and a focal length within a main scanning cross of the scanning optical means is fs [mm], satisfies a conditional expression (d·w)/(fn·fs)<0.003.

In the present invention, it is preferable that the light source means is provided with a plurality of light-emitting portions independently from each other.

Still further object of the present invention is to provide an image forming apparatus comprising: the above mentioned multi-beam scanning optical system, a photosensitive member disposed on a surface to be scanned, a developing device for developing an electrostatic latent image formed on the photosensitive member by a light beam scanned by the multi-beam scanning optical system as a toner image, a transferring device for transferring the developed toner image onto a transferring material, and a fixing device for fixing the transferred toner image on the transferring material.

Still further object of the present invention is to provide an image forming apparatus comprising: the above mentioned multi-beam scanning optical system, and a printer controller for converting code data inputted from external equipment into an image signal and inputting the signal in the multi-beam scanning optical system.

DESCRIPTION OF THE PREFERRED EMBODIMENTS

First, technical means for attaining the object of the present invention will be hereinafter described with reference to FIGS. 16A to 18B.

Note that, in order to prevent the figures from becoming unclear, a BD sensor that is otherwise shown on the upper side of the figures is not shown in all of the above-described figures. Also, a marginal light beam is not shown in FIGS. 17A and 18A.

Figure 16A:
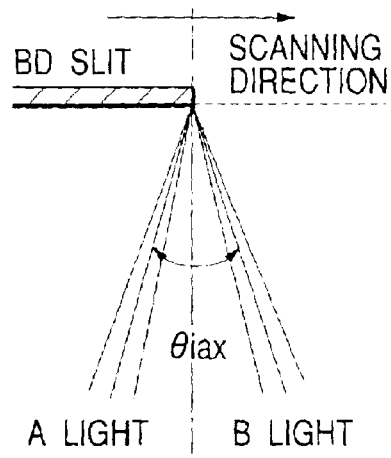
FIGS. 16A and 16B are explanatory views showing a positional relationship of each light beam in an ideal state.

FIG. 16A shows a state of each instance when each light beam (here, A and B lights) is condensed precisely on one end (right end in the figure) of a BD slit with respect to a main scanning direction. The A light scanned from the left to the right in the figure is incident on the BD sensor for the first time when it reaches precisely the right end of the BD slit. At this point, the BD sensor outputs a signal informing that the A light is incident thereon.

Figure 16B:
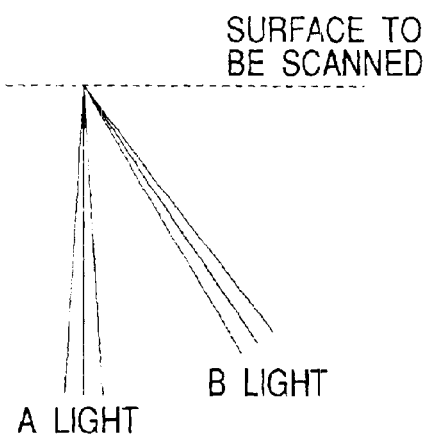

Next, the B light scanned from the left to the right is incident on the BD sensor for the first time when it reaches precisely the right end of the BD slit in the same manner as the A light. At this point, the BD sensor outputs a signal informing that the B light is incident thereon. Timing of these two signals is detected, whereby the timing at writing positions of the A and B lights is adjusted. FIG. 16B shows writing positions at the time when a relationship of each light is in the state of FIG. 16A. The writing positions of the A and B lights are uniform in this state.

Figure 17A:
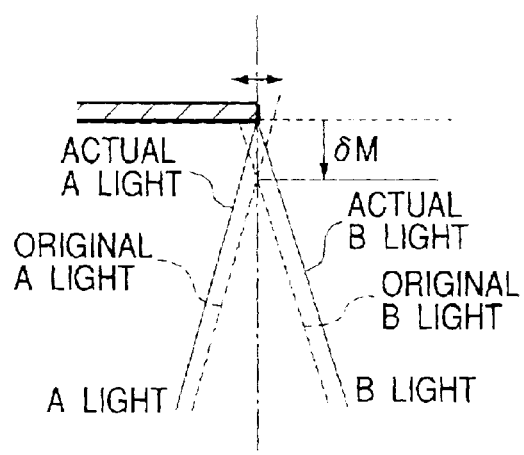
FIGS. 17A and 17B are explanatory views showing a positional relationship of each light beam when the focus deviates to a front side (deflection means side)

However, when the position of the focus of the A and B lights that have passed through an optical element, which condenses each light beam on a BD slit in a main scanning cross section (hereinafter referred to as "BD condensing element"), relatively deviates to the front side, that is, deflection means side by δM as shown in FIG. 17A, a phenomenon discussed below occurs and the writing positions of the A and B lights deviate. The A light, which otherwise is in such timing that it is condensed at the right end of the BD slit and gradually starts to be incident on the BD sensor, has already been incident on the BD sensor due to the focus deviation (a broken line on the left side in the figure). The A light actually starts to be incident on the BD sensor when it is in a position shown by a solid line on the left side in the figure. The writing timing of the A light is earlier by an amount of deviation between the broken line and the solid line.

Figure 17B:
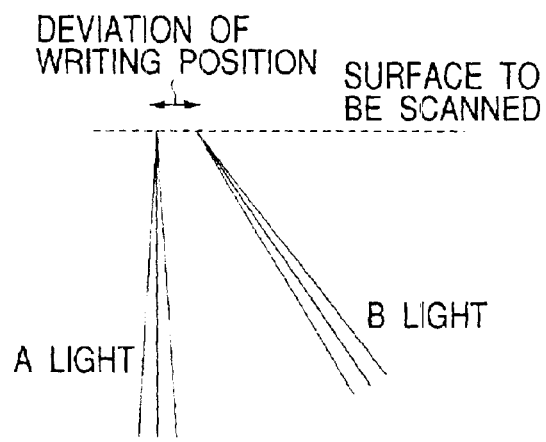

Conversely, the B light, which is otherwise starts to be incident on the BD sensor when it is in a position of a broken line on the right side, cannot be incident due to the focus deviation until it reaches a position of a solid line on the right side. Thus, the writing start timing of the B light is delayed by the amount of deviation between the broken line on the right side and the solid line on the right side. Consequently, the relative writing positions of the A and B lights deviate according to a distance between the two broken lines on the BD slit surface as shown in FIG. 17B.

Figure 18A:
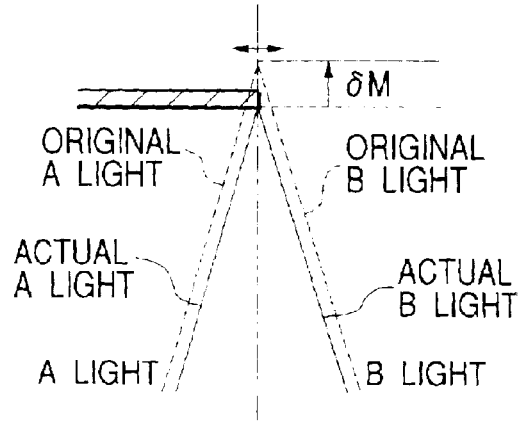
FIGS. 18A and 18B are explanatory views showing a positional relationship of each light beam when the focus deviates to an inner side (opposite side of the deflection means)
Figure 18B:
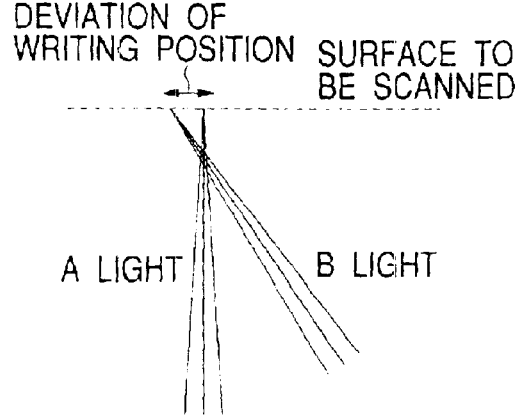

On the other hand, when the position of the focus of the A and B lights relatively deviates to the inner side, that is, the opposite side of the deflection means by δM as shown in FIG. 18A, the two broken lines are spaced apart on the BD slit surface in the same manner as described above. Thus, as shown in FIG. 18B, the relative writing positions deviate according to a distance between the two broken lines. This case is different from the above-mentioned case in that the relationship of the writing positions of the A and B lights is opposite in the main scanning direction.

Figure 15:
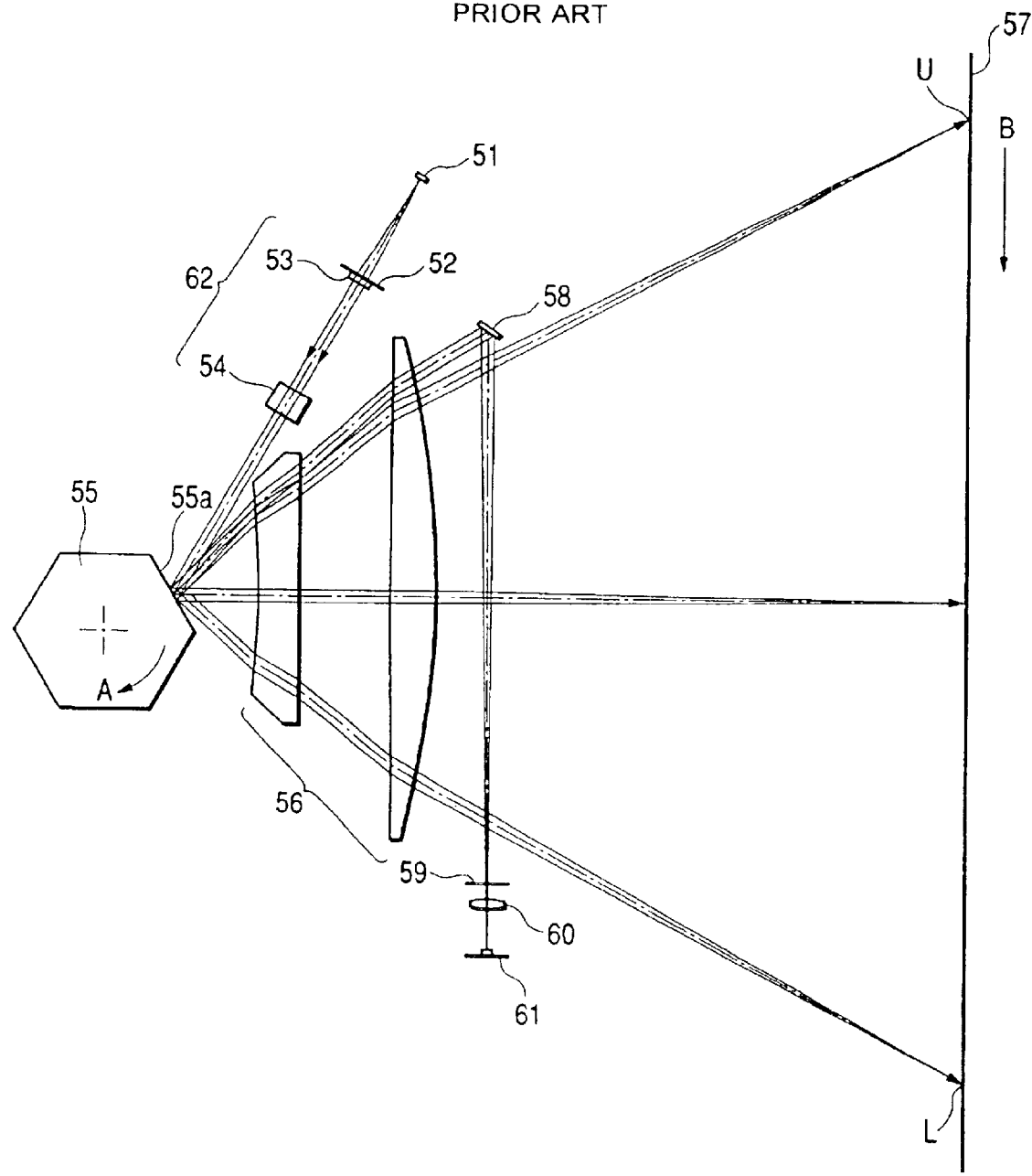
FIG. 15 is a main scanning sectional view of a conventional multi-beam scanning optical system.

The relative writing positions deviate by the distance between the broken lines on the slit surface of FIG. 17A or FIG. 18A if a part of the scanning optical means is used as the BD condensing element as shown in FIG. 15. However, if the scanning optical means and the BD condensing element are optically independent from each other, an amount of relative deviation of an actual writing position involves not only the above-mentioned distance between the broken lines but also a focal length in the main scanning direction of the scanning optical means and a focal length in the main scanning direction of the BD condensing element. When the above-mentioned two focal lengths are different, a lateral magnification by the incident optical means and the scanning optical means and a lateral magnification by the incident optical means and the BD condensing element are different. In addition, a ratio of the two lateral magnifications depends on the focal length of the scanning optical means and the focal length of the BD condensing element. Strictly speaking, the ratio of the focal lengths and the ratio of the lateral magnifications are different if the incident optical means is not a parallel system. However, since the incident optical means is not generally an extreme convergent or divergent system, the ratio of the focal lengths and the ratio of the lateral magnifications can be treated as identical.

In addition, the focal length in the main scanning direction of the BD condensing element is often shorter than the focal length in the main scanning direction of the scanning optical means. This is because, if the focal length in the main scanning direction of the BD condensing element is made equal to or longer than that of the scanning optical means, the BD condensing element cannot be disposed spatially or an additional mirror is required for folding an optical path. Consequently, the distance between the broken lines on the BD slit surface is enlarged according to the ratio of the focal length of the scanning optical means to the focal length of the BD condensing element.

Figure 19:
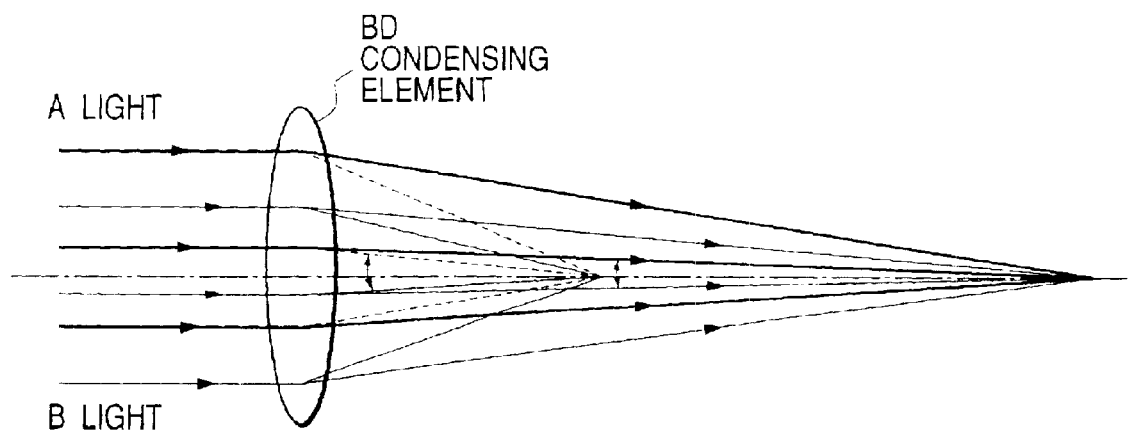
FIG. 19 is a view showing a relationship between a BD condensing lens and light beams.

Note that, as shown in FIG. 19, the shorter the focal length of the BD condensing element becomes, more likely a difference of incident angles of the A and B lights occurs when the lights are incident on the BD slit. This difference of angles is substantially in inverse proportion to the focal length of the BD condensing element. Consequently, the distance between the broken lines on the BD slit surface becomes larger in proportion to a reciprocal of the focal length.

When the above-mentioned two phenomena are taken into account, even if the amount of deviation of a focus position within the main scanning cross section viewed from the BD slit surface is the same, the writing positions deviate by a square of the ratio of the focal length in the case where the scanning optical means and the BD condensing element are optically independent from each other compared with the case where a part of the scanning optical means is used as the BD condensing element. Thus, it becomes necessary to strictly control the deviation of a focus position within the main scanning cross section viewed from the BD slit surface. However, since strict control of a tolerance tends to deteriorate yield, it is preferable to avoid it as much as possible.

The above-mentioned phenomena are attributable to the fact that the A and B lights are incident on the BD slit surface at different angles. Assuming that the incident angles are identical, a relative writing position does not deviate even if the focus deviates, although an overall writing position does. This does not lead to significant deterioration of a printing quality. In addition, this phenomenon of causing a difference in incident angle is attributable to the fact that a position of each light incident on the BD condensing element deviates when each light is guided to the BD sensor.

Figure 20:
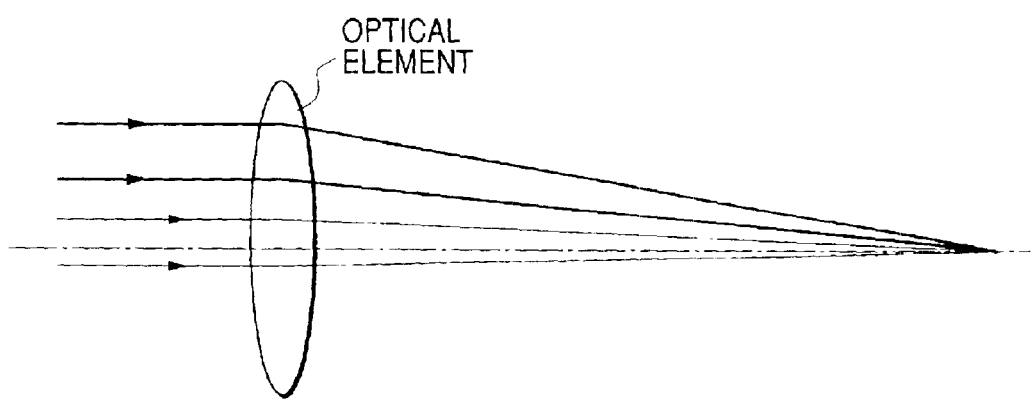
FIG. 20 is a view showing a relationship between passing positions and refraction of lights.

For example, if the BD condensing element is a lens, lights incident on the vicinity of a light axis of an optical element do not substantially change their angle after emission as shown in FIG. 20. However, travelling directions of lights incident on an end of the lens are bent according to a refracting power of the lens. If the BD condensing element is a mirror, the same phenomenon occurs. If light sources are spaced apart from each other in the main scanning direction, an incident position of each light on the BD condensing element always deviates unless an aperture stop is provided on a deflection surface. Thus, when lights are condensed on the BD slit surface, the lights are incident thereon at different angles. As a result, when the focus deviates, the timing of each light incident on the BD sensor deviates according to an incident angle on the BD slit, resulting in relative deviation of a writing position. This phenomenon always occurs as long as a deflection point of each light beam deviates in the main scanning direction whether the light source is a monolithic light source having a plurality of light-emitting portions, a plurality of independent light sources are arranged adjacent with each other, or light beams are turned into a multi-beam using light beam compositing means.

Figure 21:
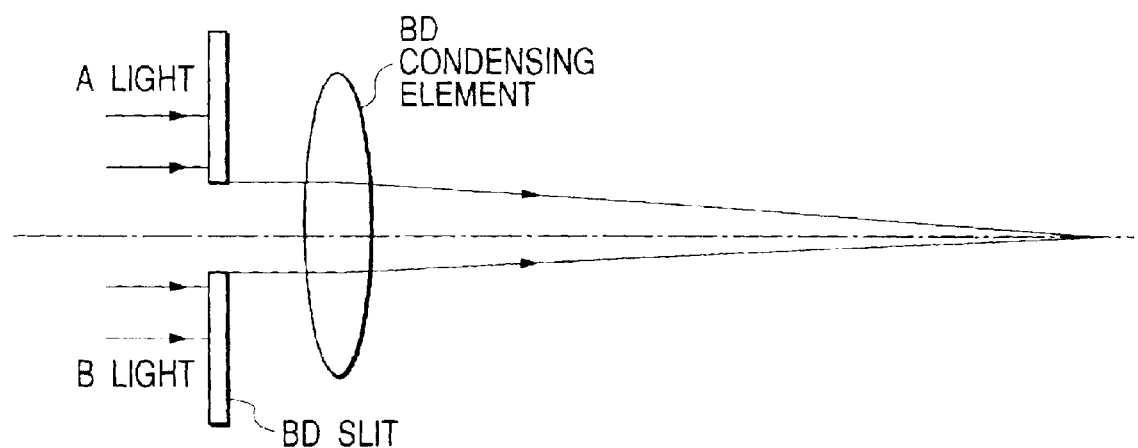
FIG. 21 is a view showing passing positions of lights depending on a presence or absence of a BD stop.

As a method of preventing such a phenomenon, a method of placing an aperture stop between the deflection means and the BD slit (hereinafter referred to as "BD stop") is possible. When this method is used, it becomes possible to forcibly arrange a position, where each light beam is incident on the BD condensing element as shown in FIG. 21, to be uniform, and an angle of each light beam incident on the BD slit becomes uniform. As a result, even if the focus deviates, since all the light beams causes the writing positions to deviate by the same degree, relative deviation of a writing position does not occur and deterioration of a printed image can be reduced.

In order to sufficiently obtain the above-mentioned effects, at least widths in the main scanning direction of all the light beams is required to be determined by the BD stop at each instance when each light beam starts to be incident on the BD sensor. In this case, main light positions in the main scanning direction of all the lights become identical (overlapped) after passing through the BD stop. If widths of some light beams are not determined by the BD stop, since only these light beams are incident on the BD condensing lens in a different position, a position of a main light deviates. Thus, if the focus deviates, writing positions corresponding to these light beams relatively deviate.

The relative deviation of a writing position due to focus deviation viewed from the BD slit can be reduced by providing the BD stop in the synchronization detection optical means. However, if the focus position of the light beams condensed by the scanning optical means viewed from the surface to be scanned deviates in this case, the relative positional relationship of the A and B lights in the main scanning direction deviates compared with an ideal case (such a phenomenon is hereinafter referred to as "deviation of a dot position"), and the effects of the above-mentioned measures are reduced by half.

Figure 22:
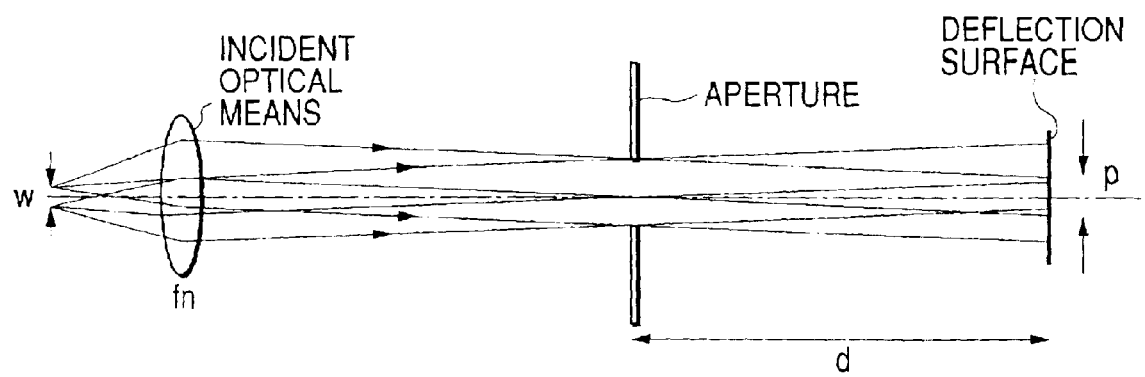
FIG. 22 is a main part schematic view of incident optical means.

A cause of the above-mentioned phenomenon is that the A and B lights are apart from each other in the main scanning direction on the deflection surface. Given that the distance in the main scanning direction of the light-emitting point is w, the focal length in the main scanning direction of the incident optical means is fn, and the distance from the aperture stop to the deflection point is d, the distance between the A and B lights p can be represented as follows (see FIG. 22).

$$p=d \cdot w/fn$$

Figure 23:
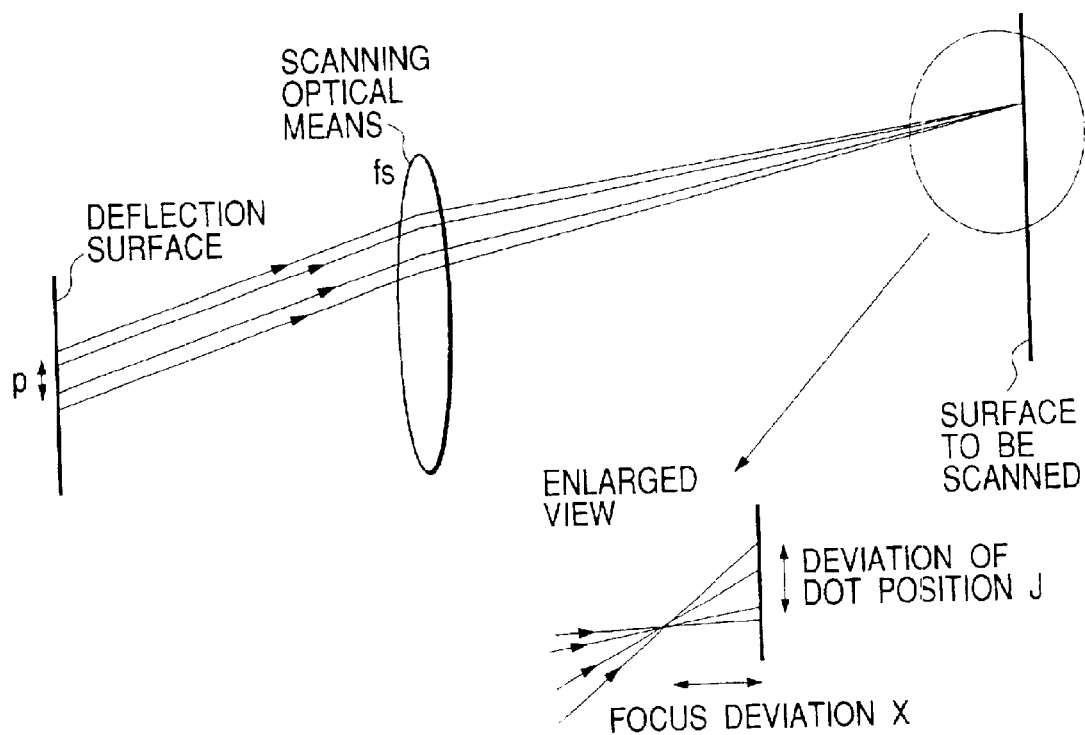
FIG. 23 is a main part schematic view of scanning optical means.

Then, given that the position of the focus viewed from the surface to be scanned is x and the focal length of the scanning optical means is fs, an amount of deviation of a dot position J is represented as follows if it is assumed to be zero in the ideal case (see FIG. 23).

$$J=p \cdot x/fs=(d \cdot w/fn) \cdot (x/fs)$$

Thus, a sensitivity of relative deviation of a position J/x with respect to an amount of focus deviation x is represented as follows.

$$J/x=(d \cdot w)/(fn \cdot fs)$$

With the examination hitherto conducted, it has been found that a printed image is given incongruity when the deviation of a dot position occurs at least in about half a dot. Given that a resolution is 1200 dpi, the relative deviation of a position is required to be controlled to 10 $\mu$m or less. In addition, the amount of focus deviation x viewed from the surface to be scanned is required to be allowed for approximately 3 mm taking into account a surface accuracy and an assembly accuracy of the scanning optical means. Thus, the sensitivity of the relative deviation of a position J/x with respect to the amount of focus deviation x is required to be as follows.

$$J/x=(d \cdot w)/(fn \cdot fs) \leq 0.003 \quad (1)$$

More preferably, it is desired to be as follows.

$$(d \cdot w)/(fn \cdot fs) \leq 0.0018 \quad (1')$$

There is only one way of reducing the distance w in the main scanning direction of the light-emitting point and the distance d from the aperture stop to the deflection point to zero in order to meet the above conditional expression (1). It is to arrange the light-emitting portions in a state in which each light-emitting portion does not deviate in the main scanning direction, that is, align the light-emitting portions in the sub scanning direction, or to arrange the aperture stop or the conjugate point of the aperture stop on the deflection surface, thereby causing the main light of each light beam to cross on the deflection surface.

Concerning the former case, usually, when each light-emitting portion is arranged in this way, in particular, if the sub scanning direction is constituted in a magnification system, the distance between the light-emitting portions becomes too short as much as about several $\mu$m to ten and several $\mu$m (a distance between light-emitting portions of a commercially available multi-laser is in the order of 100 $\mu$m), crosstalk occurs and an amount of light differs in each light-emitting portion. Thus, oscillation is not stable any more and a life of the light-emitting portions tends to be short.

Concerning the latter case, in order to arrange the aperture stop on the deflection surface, a desired state can be realized by giving the deflection surface a function as the aperture stop without providing anything equivalent to the aperture stop at least in the main scanning direction. However, this is not preferable because the width of the light beams to be deflected changes as the deflective scanning is performed and, thus, a spot diameter changes and an amount of light also changes. In addition, there is also a method of using a relay optical system as a method of providing the conjugate point of the aperture stop on the deflection surface. However, when the relay optical system is used, a required number of optical elements increases, which is not preferable in terms of space and costs.

The above description is set forth as if it is on the premise that there are two light sources. However, the description is actually established in a case where there are more light sources as well. Given that lasers irradiating light on both ends in the main scanning direction is lasers A and B, respectively, the above description as it is can be applied to a worst combination thereof.

In addition, in the case of the multi-beam scanning optical system not having the BD slit in the BD optical system, the part of the edge of the BD sensor eventually serves as the BD slit. Thus, the right end of the BD slit may be read as a left end of an effective portion of the BD sensor, and the BD slit surface may be read as a light-receiving surface of the BD sensor.

In addition, the scanning direction is from the left to the right in the figure in the above description. However, even if the scanning direction is reversed, the same description may apply except that the BD slit determining the writing start timing is changed from the right end to a left end of a BD slit on the right side not shown in the figure.

Next, each embodiment of the present invention will be described.

First Embodiment

Figure 1:
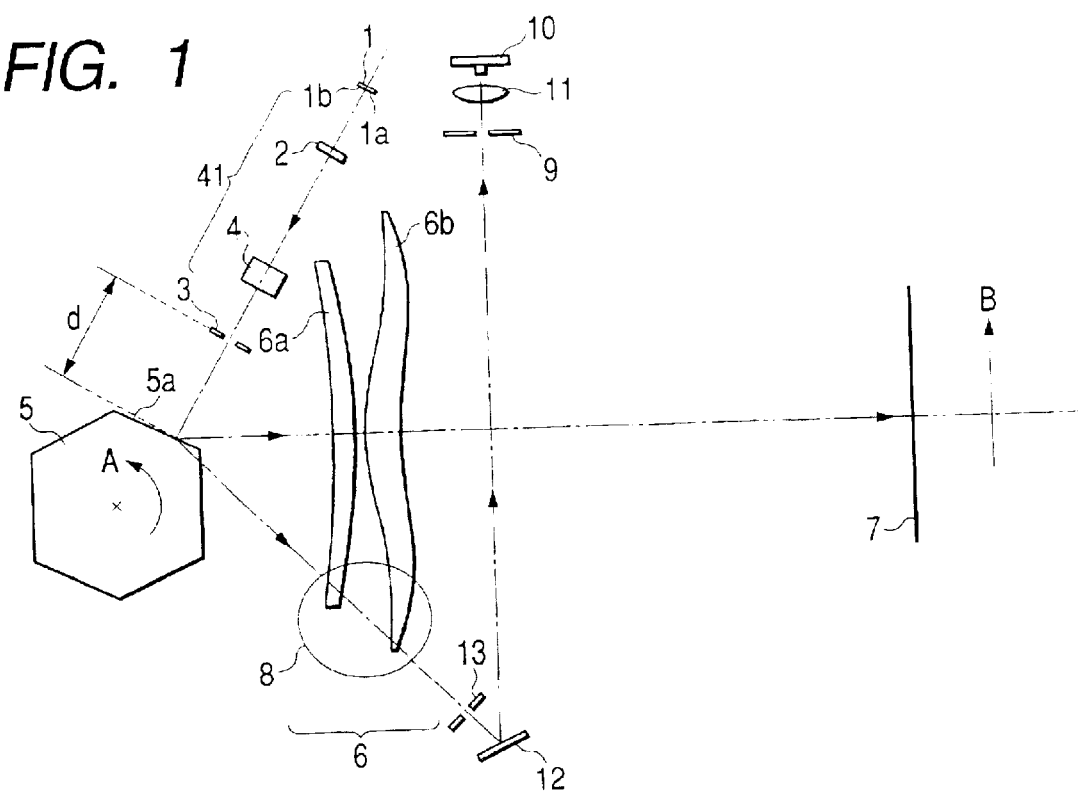
FIG. 1 is a main scanning sectional view of a first embodiment of the present invention.

FIG. 1 is a main part sectional view in a main scanning direction (main scanning sectional view) of a first embodiment of a multi-beam scanning optical system of the present invention.

Note that, in this specification, a surface formed by a light axis of scanning optical means and light beams deflected by a light deflector is defined as a main scanning cross section, and a surface that includes the light axis of the scanning optical means and is perpendicular to the main scanning cross section is defined as a sub scanning cross section.

Figure 2:
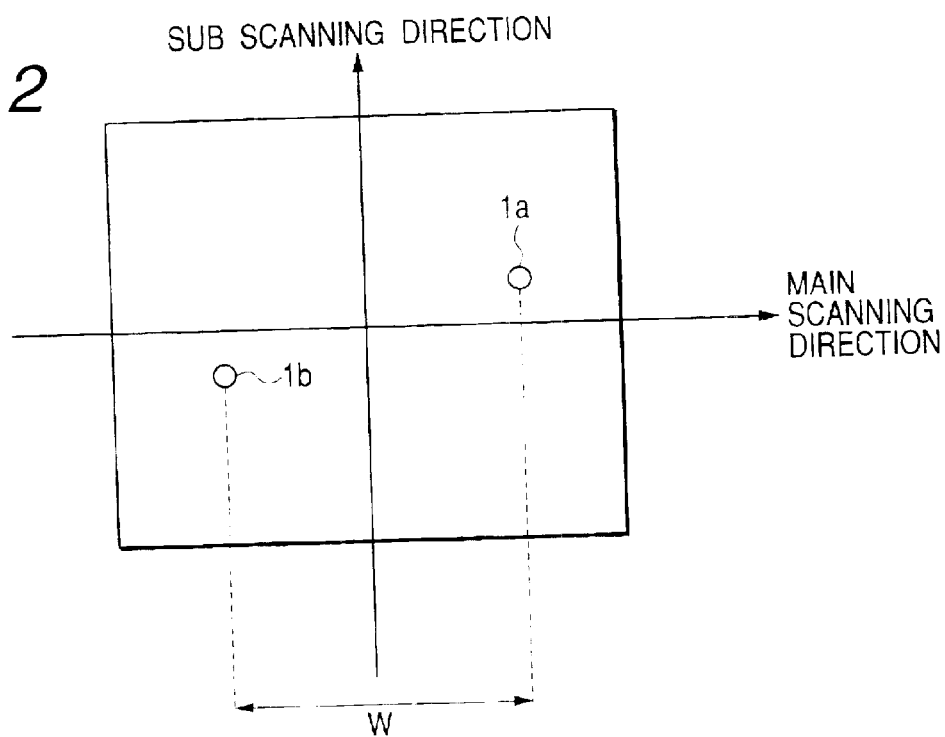
FIG. 2 is an explanatory view showing an arrangement of each light-emitting portion.

In the figure, reference numeral 1 denotes a light source unit (light source means), which has, for example, two light-emitting portions (light sources) 1a and 1b consisting of semiconductor lasers. Note that three or more light-emitting portions may be included. As shown in FIG. 2, the two light-emitting portions 1a and 1b are spaced apart from each other in the main scanning direction and the sub scanning direction. A distance between the light-emitting portions is longer in the main scanning direction than in the sub scanning direction as in FIG. 2. This is because a distance between actual light-emitting portions is longer than an actually required distance between the light-emitting portions in the sub scanning direction, and the distance between the light-emitting portions in the sub scanning direction is set at a desired value by rotating the light source unit 1 having the two light-emitting portions 1a and 1b.

Reference numeral 2 denotes a collimator lens, which converts divergent light beams emitted from each of the light-emitting portions 1a and 1b into substantially parallel light beams.

Reference numeral 4 denotes a cylindrical lens, which has a predetermined refracting power only in the sub scanning direction. The cylindrical lens is arranged to be movable in the light axis direction when it is assembled in order to make adjustable a beam-condensing state in the sub scanning direction on a photosensitive drum surface 7 discussed below. After the adjustment, the cylindrical lens 4 is fixed.

Reference numeral 3 denotes an aperture stop as a second light beam limiting element, which forms the light beams that have been emitted from each of the light-emitting portions 1a and 1b and transmitted through the collimator lens 2 and the cylindrical lens 4 in a desired optimal beam shape. This aperture stop 3 is brought close to a deflection surface 5a of a light deflector 5, whereby deflection points of the light beams emitted from each of the light-emitting portions 1a and 1b are brought close to each other and sensitivity of deviation of a dot position with respect to focus deviation is reduced.

Note that each of the collimator lens 2, the cylindrical lens 4 and the like constitutes an element of incident optical means 41. Reference numeral 5 denotes a light deflector as deflection means, which consists of, for example, a rotary polygon mirror and rotates in an arrow A direction in the figure at a constant speed by driving means (not shown) such as a motor.

Reference numeral 6 denotes scanning optical means having an fθ characteristic, which has first and second two optical elements (fθ lenses) 6a and 6b, images two light beams deflected by the light deflector 5 in a spot shape on the photosensitive drum surface 7, which is a surface to be scanned, thereby forming two scanning lines. The scanning optical means 6 establishes an optically conjugate relationship between the vicinity of the deflection surface 5a of a light deflector 5 and the vicinity of photosensitive drum surface 7 within the sub scanning cross section, thereby realizing a toppling correcting function.

Reference numeral 8 denotes a BD condensing lens, which has a predetermined power in the main scanning direction and the sub scanning direction and focuses (condenses) a plurality of light beams (BD light beams) for synchronization signal detection on a surface of a BD slit 9 provided in the vicinity of a BD sensor 10 discussed below or in its vicinity. Note that, although the BD condensing lens 8 in this embodiment is integrally formed with the scanning optical means 6, it may be independently provided.

Reference numeral 13 denotes a synchronization detection stop (hereinafter referred to as "BD stop") as a first light beam limiting element, which is provided between the BD condensing lens 8 and the BD slit 9 and defines a lens passing position when the BD light beams pass through the BD condensing lens 8. In this embodiment, relative deviation of a writing position attributable to the fact that a convergent point of the BD light beams is apart from the BD slit 9 discussed below is reduced.

Reference numeral 12 denotes a return mirror (hereinafter referred to as "BD mirror"), which reflects a plurality of BD light beams for adjusting timing at a scanning start position on the photosensitive drum surface 7 toward the BD sensor 10.

Reference numeral 9 denotes a synchronization detection slit (hereinafter referred to as "BD slit"), which is disposed in a condensing position of light beams converged by the BD condensing lens 8 or in its vicinity and determines a writing position of an image.

Reference numeral 11 denotes a lens for establishing a conjugate relationship between the BD mirror 12 and the BD sensor 10 (hereinafter referred to as "BD conjugate lens"), which corrects toppling of the BD mirror 12.

Reference numeral 10 denotes an optical sensor (hereinafter referred to as "BD sensor") as a synchronization detection element, which, in this embodiment, adjusts the timing of a scanning start position of image recording on the photosensitive drum surface 7 for each BD light beam using a synchronization signal (BD signal) obtained by detecting an output signal from the BD sensor 10.

Note that, although the BD stop 13 and the BD mirror 12 are provided as separate members in this embodiment, an action of a BD stop may be given to an edge portion of the BD mirror or to a BD mirror holding member for holding the BD mirror as in third and fourth embodiments discussed below.

In addition, each of the BD condensing lens 8, the BD stop 13, the BD mirror 12, the BD slit 9, the BD conjugate lens 11, the BD sensor 10 and the like described above constitutes an element of synchronization detection optical means (a BD optical system).

In this embodiment, two light beams optically modulated and emitted from the light source unit 1 according to image information are converted into the substantially parallel light beams by the collimator lens 2 and are incident on the cylindrical lens 4. The light beams incident on the cylindrical lens 4 are directly projected within the main scanning cross section. In addition, the light beams converge within the sub scanning cross section to be formed substantially as linear images (linear images elongated in the main scanning direction) on the deflection surface 5a of the light deflector 5 via the aperture stop 3. In this case, a size of a cross section of the light beam is limited by the aperture stop 3. Then, the two light beams reflected and deflected by the deflection surface 5a of the light deflector 5 are imaged in a spot shape on the photosensitive drum surface 7 by the scanning optical means 6. As the light deflector 5 is rotated in the arrow A direction, the light beams are scanned on the photosensitive drum surface 7 in an arrow B direction (main scanning direction) at a uniform speed. Consequently, an image is recorded on the photosensitive drum surface 7 functioning as a recording medium.

In this case, in order to adjust the timing at a scanning start position on the photosensitive drum surface 7 before optically scanning the photosensitive drum surface 7, a part of the two light beams reflected and deflected by the light deflector 5 is passed through the BD stop 13 by the BD condensing lens 8 to be condensed on the surface of the BD slit 9 with respect to the main scanning cross section via the BD mirror 12, and then guided to the BD sensor 10 through the BD conjugate lens 11. Then, the timing at the scanning start position of image recording on the photosensitive drum surface 7 is adjusted for each BD light beam using the synchronization signal (BD signal) obtained by detecting the output signal from the BD sensor 10.

Here, effects and the like of the BD stop 13 in the present invention will be described.

Assuming that the BD stop 13 is not provided, writing positions of A and B lights deviate and a printed image is deteriorated when a focus position of the BD light beams viewed from the surface of the BD slit 9 deviates as described above.

In order to sufficiently obtain the effects of the BD stop 13, the BD stop 13 is required to be set such that at least a width in the main scanning direction of all the BD light beams is determined by the BD stop 13 at each instance when each BD light beam starts to be incident on the BD sensor 10, whereby main light positions in the main scanning direction of all the BD light beams become identical (overlapped) after passing through the BD stop 13. In this embodiment, the BD stop 13 is structured in this way. If widths of some BD light beams are not determined by the BD stop 13, only these BD light beams are incident on the BD condensing lens 8 in a different position. Thus, for example, if the focus deviates, writing positions corresponding to these BD light beams relatively deviate.

The relative deviation of a writing position due to focus deviation viewed from the BD slit 9 can be reduced by providing the BD stop 13 in the BD optical system. However, if the focus position of the light beams condensed by the scanning optical means 6 viewed from the photosensitive drum surface 7 deviates in this case, the relative positional relationship of the A and B lights in the main scanning direction deviates compared with the ideal case (such a phenomenon is hereinafter referred to as "deviation of a dot position"), and the effects of the above-mentioned measures are reduced by half.

Thus, in this embodiment, given that a distance from the aperture stop 3 to the deflection point on the light deflector 5 is d [mm], a maximum value of a distance in the main scanning direction of light-emitting portions of a plurality of light beams is w [mm], a focal length within the main scanning cross section of the incident optical means 41 is fn [mm], and a focal length within the main scanning cross of the scanning optical means 6 is fs [mm], each element is set such that the following conditional expression is met.

$$(d \cdot w)/(fn \cdot fs) < 0.003 \tag{1}$$

That is, in this embodiment, the maximum value of the distance in the main scanning direction between the light-emitting portions of the plurality of light beams "w" is set at 0.09 mm, the focal length of the collimator lens of the incident optical means 41 "fn" is set at 24.6 mm, the focal length in the main scanning direction of the scanning optical means 6 "fs" is set at 136.2 mm, and the distance from the aperture stop 3 to the deflection point of the light deflector 5 "d" is set at 33.2 mm, whereby the above-mentioned conditional expression (1) is met as follows.

$$(d \cdot w)/(fn \cdot fs) = 0.0009 \le 0.003$$

More preferably, it is desired that the above-mentioned conditional expression (1) be as follows.

$$(d \cdot w)/(fn \cdot fs) \le 0.0018 \tag{1'}$$

In this embodiment, the BD stop 13 is provided between the BD condensing lens 8 and the BD slit 9 as described above. This is for preventing the BD stop 13 from interfering with lights that should travel to the photosensitive drum surface 7, for example, when the BD stop 13 is disposed on the light source unit 1 side over the BD condensing lens (scanning optical means) 8. It is needless to mention that the BD stop 13 may be disposed on the light source unit 1 side over the BD condensing lens 8 if the BD light beams and the lights that should travel to the photosensitive drum surface 7 are sufficiently spaced apart from each other before the BD condensing lens.

In this way, in this embodiment, the BD stop 13 as the first light beam limiting element is provided in a part of the BD optical system as described above, whereby relative deviation of a writing position of each light beam due to deviation of a focus position within the main scanning cross section of light beams guided to the BD sensor 10 viewed from the slit 9 is reduced to obtain an accurate synchronization signal. In addition, each of the incident optical means 41, the scanning optical means 6 and the like is appropriately set so as to meet the conditional expression (1), whereby the photosensitive drum surface 7 can be scanned with well-focussed light beams. Consequently, jitter between the light beams on the photosensitive drum surface 7 can be eliminated and scanning can be performed with a preferable spot diameter.

Note that, in this embodiment, a time interval from the time when the A light is incident on the BD sensor 10 and an output signal is generated from the BD sensor 10 until the time when printing on the photosensitive drum surface 7 is started, and a time interval from the time when the B light is incident on the BD sensor 10 and an output signal is generated from the BD sensor 10 until the time when printing on the photosensitive drum surface 7 is started, are assumed to be equal.

Second Embodiment

Figure 3:
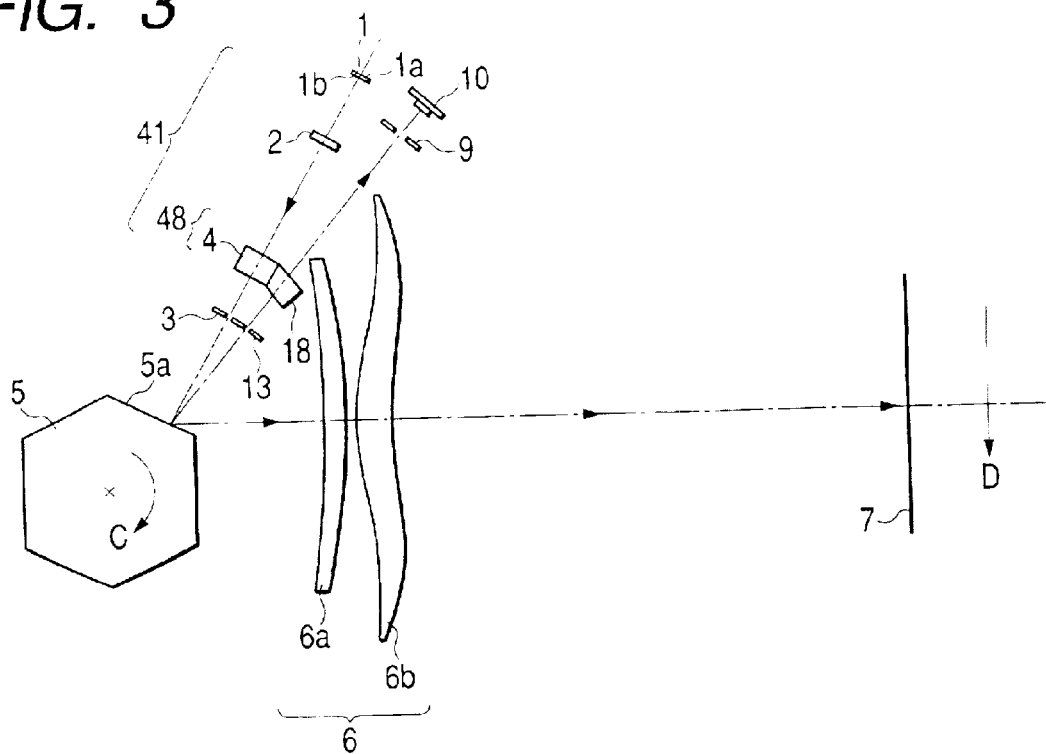
FIG. 3 is a main scanning sectional view of a second embodiment of the present invention.

FIG. 3 is a main part sectional view in a main scanning direction (main scanning sectional view) of a multi-beam scanning optical system of a second embodiment of the present invention. In the figure, elements identical with those shown in FIG. 1 are denoted by the same reference symbols.

This embodiment is different from the first embodiment in points including the following.

1. The BD condensing lens 18 is independent from the scanning optical system 6 and is integral with the cylindrical lens 4 to form a composite optical element 48.

2. The aperture stop 3 and the BD stop 13 are integrally formed.

3. A rotating direction of the light deflector 5 is a direction C and a scanning direction on the photosensitive drum surface 7 is a direction D, which are opposite from those in the first embodiment.

4. The BD mirror 12 and the BD conjugate lens 11 are not provided. The other elements and optical actions are substantially the same as the first embodiment. Consequently, the second embodiment realizes similar effects.

That is, in this embodiment, the focal length in the main scanning direction of a BD condensing lens 18 is made shorter than the focal length in the main scanning direction of the scanning optical means 6, whereby the optical path length from the deflection point of the light deflector 5 to the BD sensor 10 is reduced, and the BD mirror 12 and the BD conjugate lens 11 establishing a conjugate relationship between the BD mirror 12 and the BD sensor 10 are made unnecessary to reduce the number of components. In addition, the number of components is further reduced and the structure of the scanning optical system is simplified to reduce costs by the integration of the cylindrical lens 4 and the BD condensing lens 18 as well as the aperture stop 3 and the BD stop 13.

Since the multi-beam scanning optical system has a plurality of light-emitting portions, wavelengths of the light-emitting portions may be different from each other in the order of several nm. In such a case, scanning widths differ by a magnification chromatic aberration of the scanning optical means. When such a phenomenon occurs, if a part of the scanning optical means 6 is used as the BD condensing lens 8 as in the first embodiment, since writing start timing is determined taking into account the magnification chromatic aberration, the A and B lights are apart from each other on a writing end side.

On the other hand, in this embodiment, since the BD condensing lens 18 is independent from the scanning optical means 6 and lights pass the vicinity of light axis of the BD condensing lens 18, the magnification chromatic aberration occurs little in the BD optical system. Consequently, since the writing start timing is not affected by the magnification chromatic aberration and equally deviates on the writing start side and the writing end side, deterioration of a printed image is reduced compared with the first embodiment.

However, since the focal length in the main scanning direction of the BD condensing lens 18 is made shorter than the focal length in the main scanning direction of the scanning optical means 6, if the BD stop 13 is not provided, relative deviation of a writing position with respect to focus deviation of the BD optical system tends to appear more largely.

Since this embodiment is configured with the focal length of the BD condensing lens 18 fn=42.7 mm and the focal length in the main scanning direction of the scanning optical means 6 fs=109.0 mm, the deviation of a writing position due to the focus deviation on the surface of the BD slit 9 tends to appear 6.5 times as often as the deviation of a dot position due to the focus deviation on the photosensitive drum surface 7. Thus, it is required to increase positional accuracy of the focus on the surface of the BD slit 9.

However, in this embodiment, the BD stop 13 is provided as described above, whereby the focus in the BD optical system is treated less strictly as in the conventional apparatus having only one light-emitting portion.

This embodiment is configured such that widths of all the BD light beams in the main scanning direction are determined by the BD stop 13 at each instance when all the BD light beams start to be incident on the BD sensor 10 as in the first embodiment.

Next, the second embodiment will be described with specific examples of numerical values.

In this embodiment, the maximum value of the distance in the main scanning direction between the light-emitting points of the plurality of light beams "w" is set at 0.09 mm, the focal length of the collimator lens 2 of the incident optical means 11 "fn" is set at 16.6 mm, the focal length in the main scanning direction of the scanning optical means 6 "fs" is set at 109.0 mm, and the distance from the aperture stop 3 to the deflection point of the light deflector 5 "d" is set at 28.6 mm, whereby the above-mentioned conditional expression (1) is met as follows.

$$(d \cdot w)/(fn \cdot fs) = 0.0014 \leq 0.003 \quad (1)$$

Consequently, deviation of a main scanning dot due to the deviation of a focus position on the photosensitive drums surface 7 is reduced.

In this embodiment, the BD stop 13 is provided between the deflection surface 5a and the BD condensing lens 18. This is because, if the BD stop 13 is placed on the light source unit 1 side over the light deflector 5, positions where lights are incident on the light deflector 5 are different for each light as in the case where the BD stop 13 is not provided. Thus, positions where lights are incident on the BD condensing lens 18 are different for each light and, as a result, the relative deviation of a writing position cannot be reduced.

On the other hand, if the BD stop 13 is provided behind the BD condensing lens 18, the relative deviation of a writing position can be reduced. However, in this case, not only a width of each light beam is narrowed compared with a width before it is incident on the BD condensing lens 18 but also a change in the width of the light beam with respect to a light axis direction increases. Thus, a tolerance of the position of the BD stop 13 is strictly controlled and necessity of adjusting the position in the light axis direction of the BD stop 13 is likely to occur. Therefore, it is not so preferable to provide the BD stop 13 behind the BD condensing lens 18.

Moreover, the BD stop 13 is disposed in the above-mentioned position, whereby it becomes possible to integrally form the aperture stop 3 and the BD stop 13 that are required to be disposed as close as possible to the deflection surface 5a.

Figure 24:
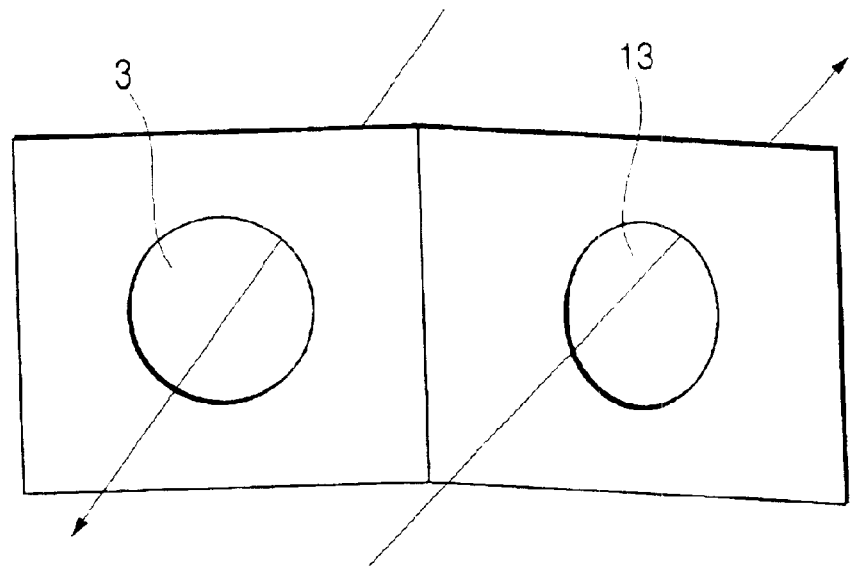
FIG. 24 is a view in which an aperture stop and a BD stop are integrated.
Figure 25:
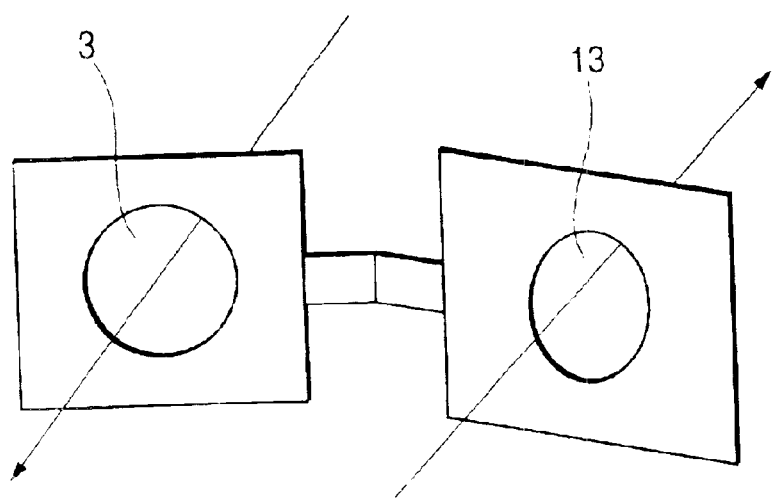
FIG. 25 is a view in which an aperture stop and a BD stop are integrated.

Note that, as an integral structure of the aperture stop 3 and the BD stop 13, for example, the aperture stop 3 and the BD stop 13 may be provided on one plate (light-shielding member) as shown in FIG. 24, or the aperture stop 3 and the BD stop 13 independent from each other may be structurally coupled to be integrated as shown in FIG. 25.

In this embodiment, the composite optical element 48 including the cylindrical lens 4 is moved along the light axis of the BD optical system in order to adjust a condensing state in the sub scanning direction on the photosensitive drum surface 7 and is fixed after the adjustment.

Figure 4:
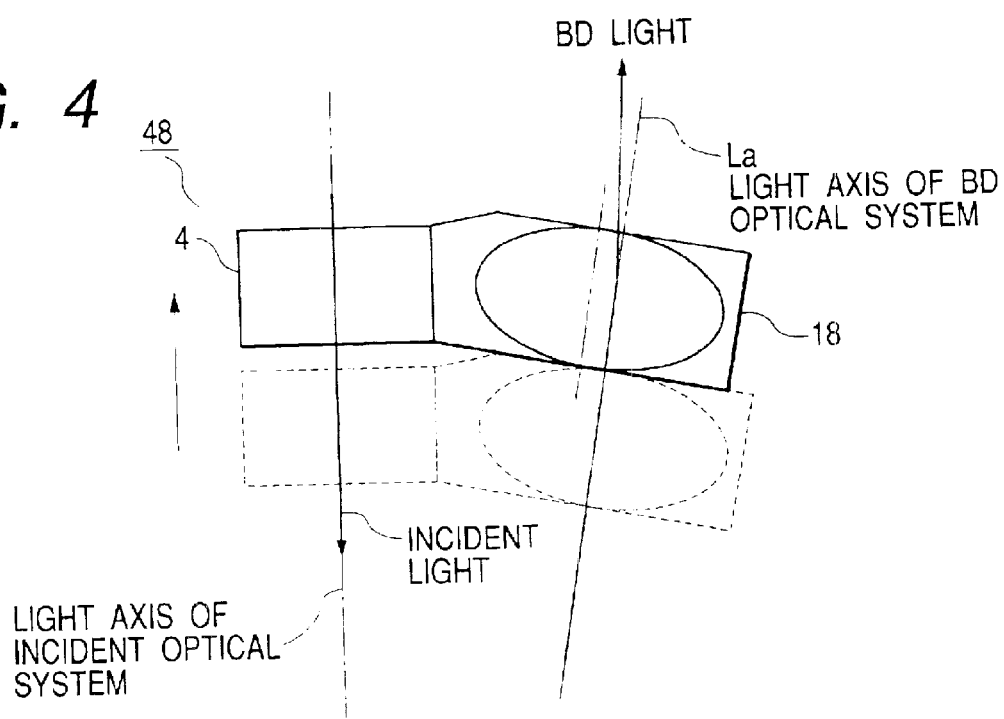
FIG. 4 is a view showing adjustment of a composite optical element and travelling directions of lights.

Assuming that a direction in which the composite optical element 48 is moved is the light axis direction of the incident optical means 41, since the BD condensing lens 18 is decentered with respect to the light axis of the BD optical system as shown in FIG. 4, and the condensing position of the BD light beams moves in the main scanning direction, this is not preferable.

Figure 5:
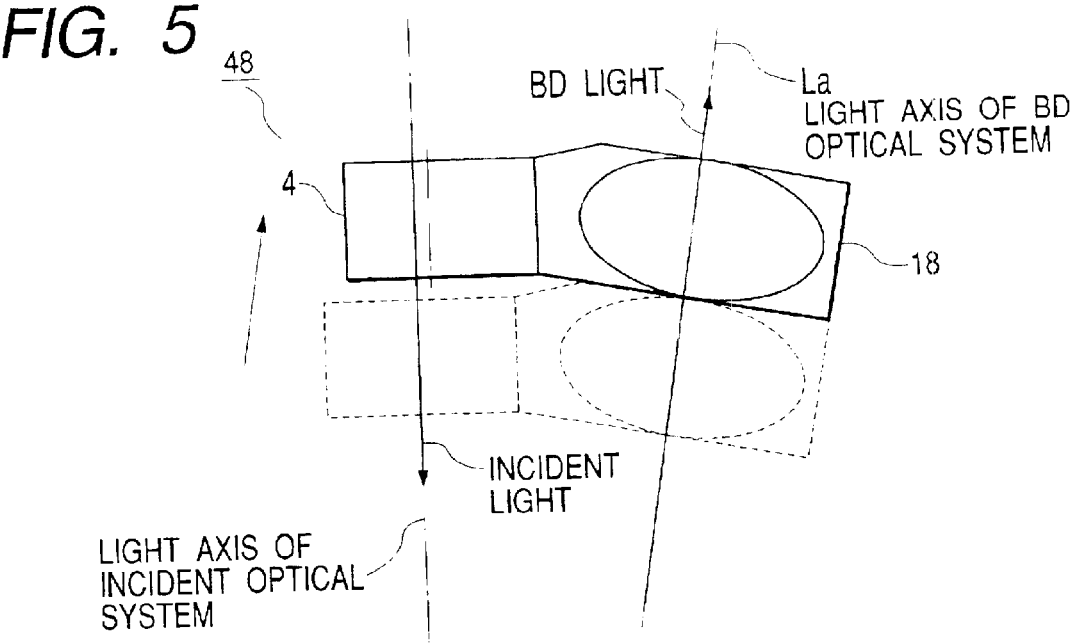
FIG. 5 is a view showing adjustment of a composite optical element and travelling directions of lights.

On the other hand, if the composite optical element 48 is adjusted in the light axis direction of the BD optical system as in this embodiment, since the cylindrical lens 4 does not have a power in the main scanning direction, it never bends light in the main scanning direction as shown in FIG. 5. Note that, in FIGS. 4 and 5, elements identical with those shown in FIG. 3 are denoted by the same reference symbols.

It is needless to mention that, in both the cases, the position of the focus in the light axis direction of the BD light beam is changed. In particular, if the BD condensing lens 18 is independent from the scanning optical means 6 as in this embodiment, since the focal length of the BD condensing lens 18 is generally shorter, relative deviation of a writing position tends to appear more.

However, the relative deviation of a writing position can also be reduced by providing the BD stop 13 to adjust the condensing state in the sub scanning direction on the photosensitive drum surface 7 with the composite optical element 48 as in this embodiment.

Third and Fourth Embodiments

Figure 6:
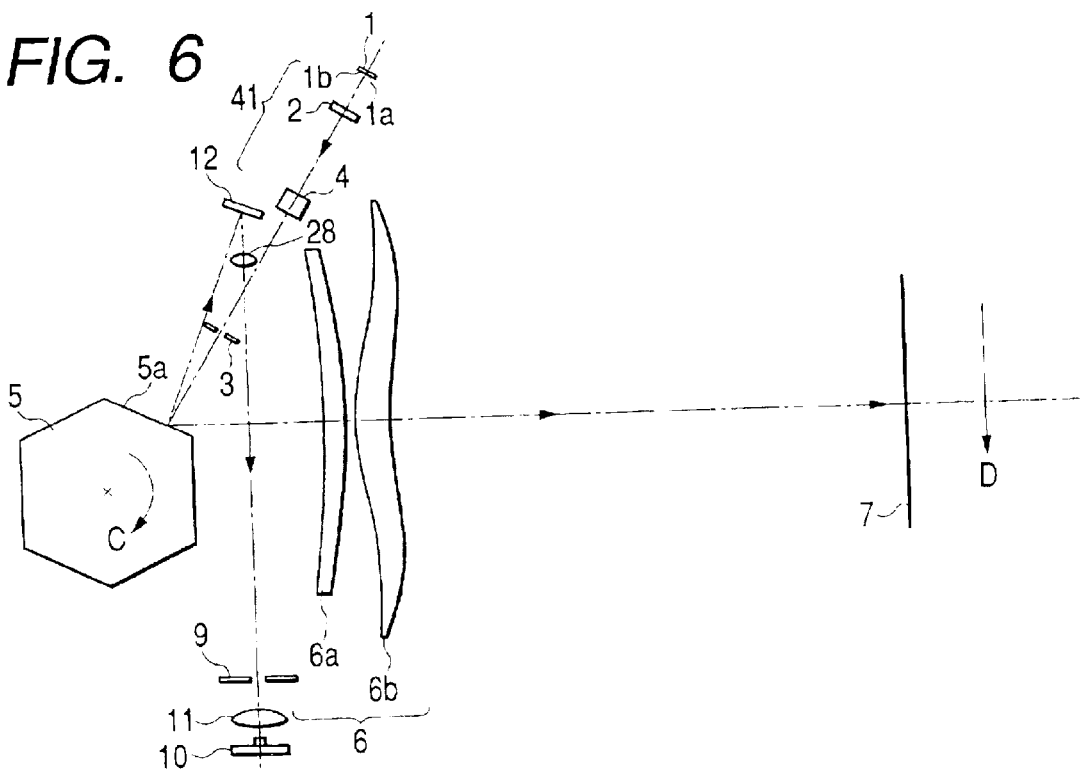
FIG. 6 is a main scanning sectional view of third and fourth embodiments of the present invention.

FIG. 6 is a main part sectional view in a main scanning direction (main scanning sectional view) of a multi-beam scanning optical system of third and fourth embodiments of the present invention. In the figure, elements identical with those shown in FIGS. 1 and 3 are denoted by the same reference symbols.

The third and fourth embodiments are different from the second embodiment in points including the following.

1. The BD optical system is disposed on a upstream of the incident optical means 41 (incident optical means is provided between synchronization detection optical means and scanning optical means).

2. The BD light beams are reflected by the BD mirror 12.

3. The edge of the BD mirror 12 or a holding member of the BD mirror 12 (hereinafter also referred to as a mirror holder) serves also as the BD stop (first light beam limiting element).

The other elements and optical actions are substantially the same as the second embodiment. Consequently, the third and fourth embodiments realize similar effects.

Figure 7:
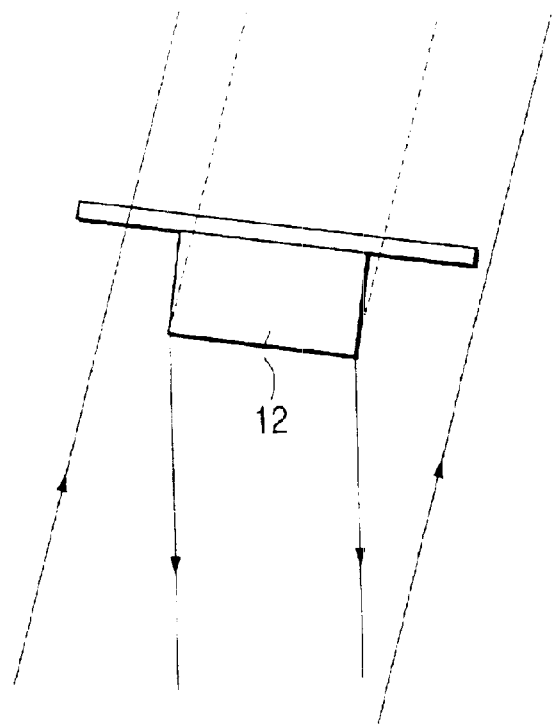
FIG. 7 is a view showing a relationship between a BD mirror and light beams.
Figure 8:
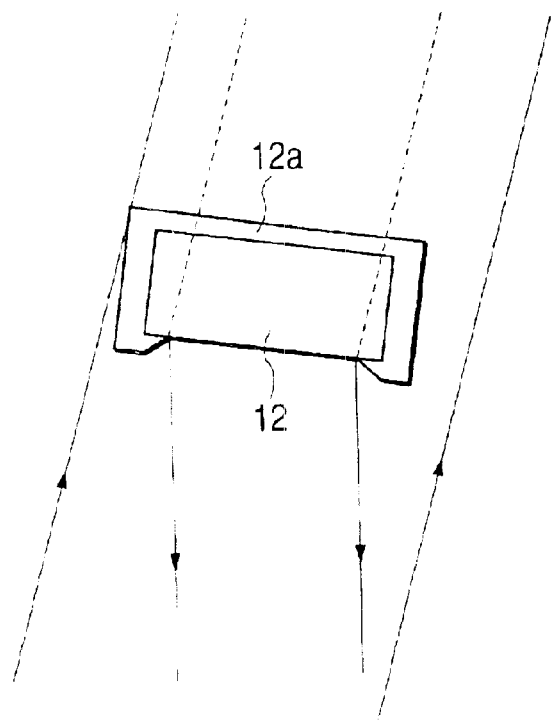
FIG. 8 is a view showing a relationship between a BD mirror holding member and light beams.

In addition, the third and fourth embodiments are different from each other in that the edge of the BD mirror 12 serves also as the BD stop as shown in FIG. 7 in the third embodiment, while a holding member of the BD mirror (mirror holder) 12a serves also as the BD stop in the fourth embodiment as shown in FIG. 8. Note that, in FIGS. 7 and 8, elements identical with those shown in FIG. 6 are denoted by the same reference symbols.

In the third and fourth embodiments, since the BD optical system cannot be disposed between the incident optical means 41 and the scanning optical means 6 due to a problem in arrangement of light source means, the BD optical system is disposed on the upstream of the incident optical means 41. In addition, since the edge of the BD mirror 12 or the holding member 12a of the BD mirror 12 serves also as the BD stop, relative deviation of a writing position of each light-emitting portion hardly occurs, but deviation of an overall writing position occurs according to focus deviation of the BD optical system. Since it is not preferable that the overall writing position moves too much, the focal length of the BD condensing lens 28 is made as long as 80 mm here. However, when the focal length of the BD condensing lens 28 is this long, since the optical path length from the deflection surface 5a to the BD sensor 10 also becomes long, the optical path is folded using the BD mirror 12.

In this case, in the third embodiment, a BD stop is not provided anew, but a width of the BD mirror 12 is given such that a light beam width is determined by the edge of the BD mirror 12 as described above, whereby the BD mirror 12 is caused to serve as a BD stop and relative deviation of a writing position is reduced.

The fourth embodiment is configured such that the mirror edge is covered by the holding member 12a of the BD mirror 12 holding the BD mirror 12 to determine a light beam width of each BD by the holding member 12a.

Note that the BD mirror 12 and the holding member 12a of the BD mirror 12 as the first light beam limiting element shown in the third and fourth embodiments may be applied to the first embodiment.

Fifth, Sixth, Seventh and Eighth Embodiments

Figure 9:
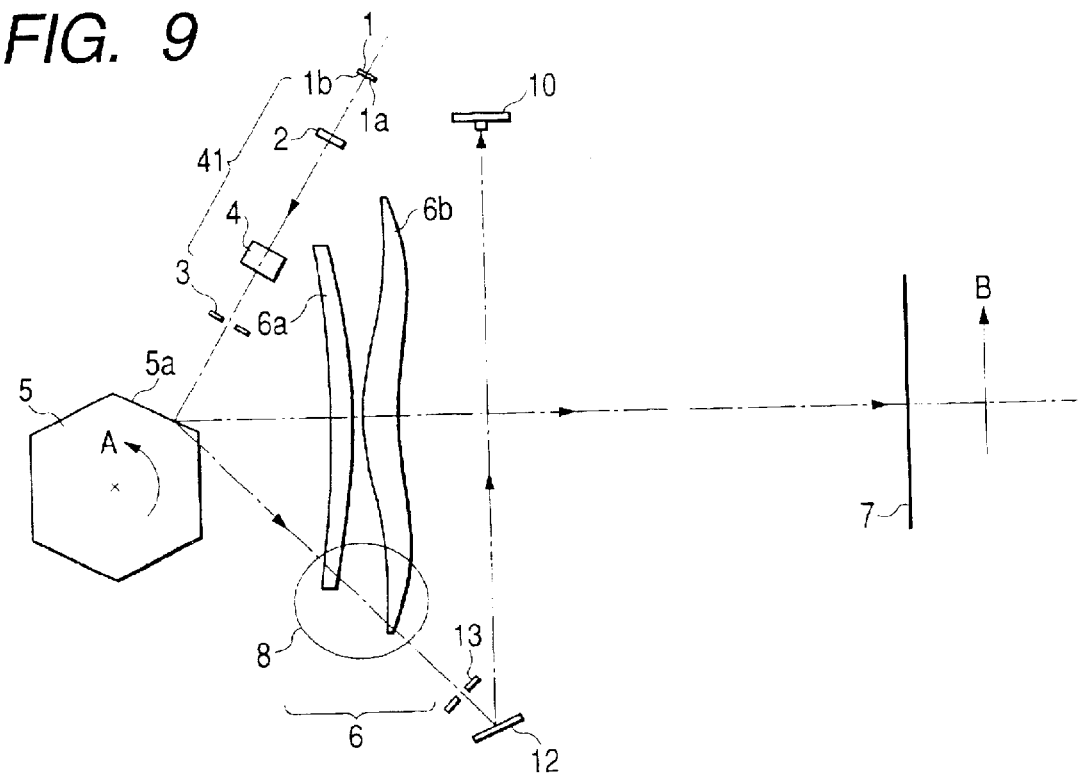
FIG. 9 is a main scanning sectional view of a fifth embodiment of the present invention.
Figure 10:
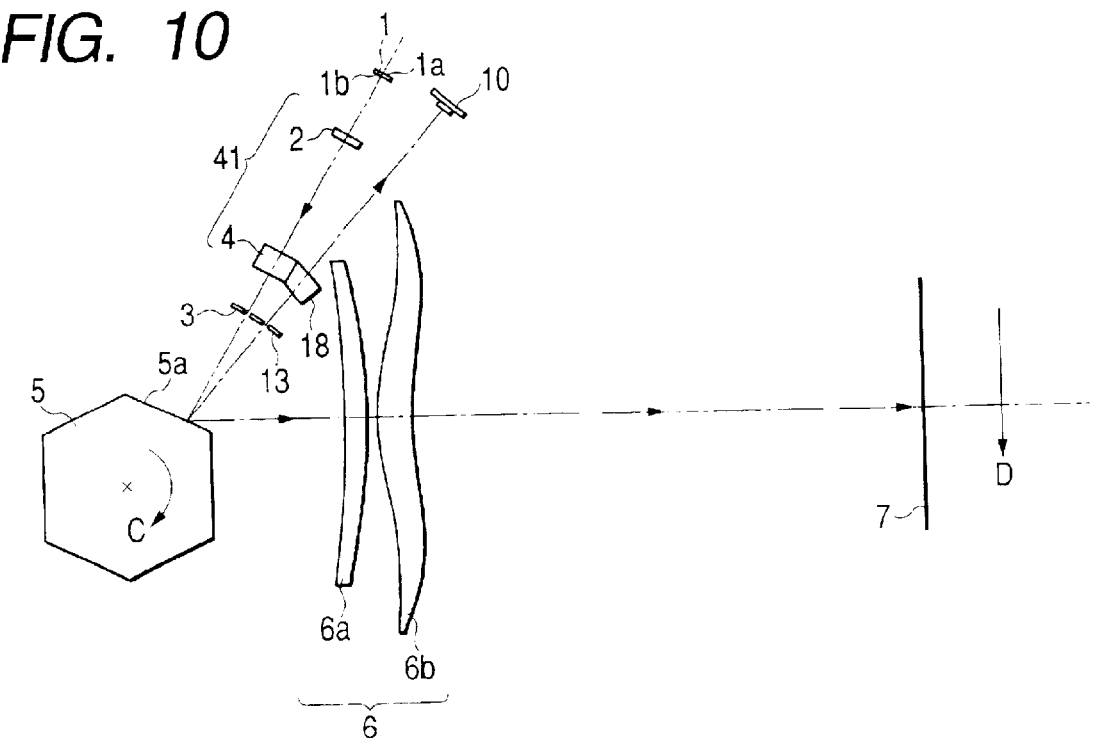
FIG. 10 is a main scanning sectional view of a sixth embodiment of the present invention.
Figure 11:
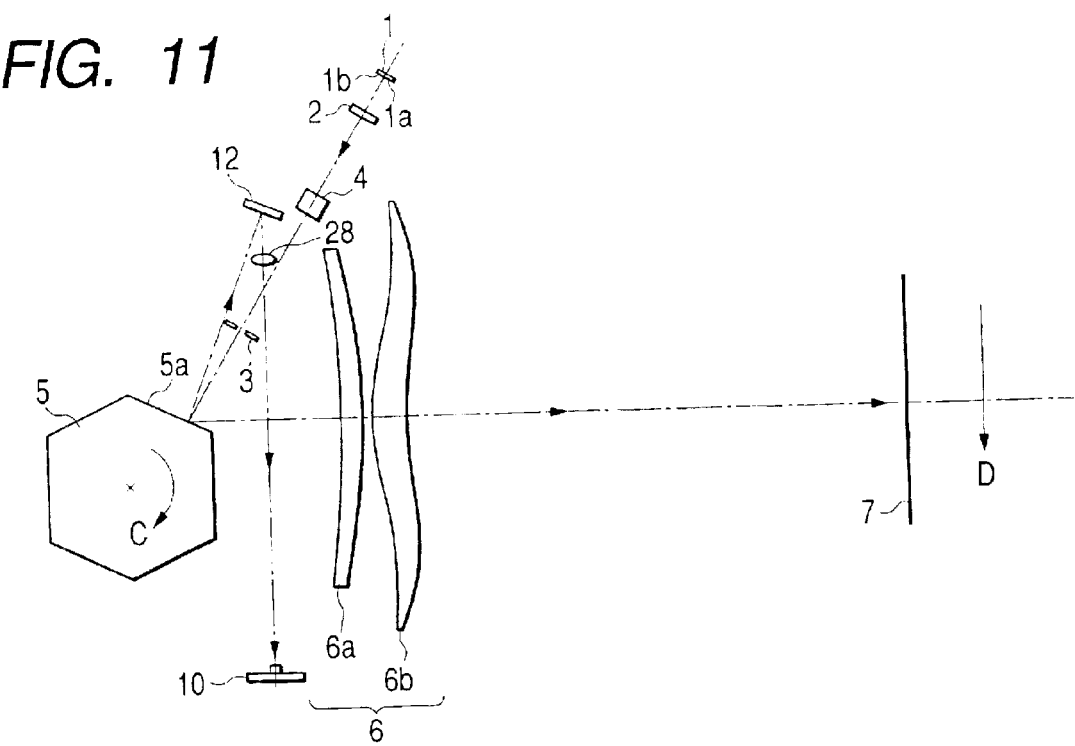
FIG. 11 is a main scanning sectional view of seventh and eighth embodiments of the present invention.

FIGS. 9, 10 and 11 are main part sectional views in main scanning directions (main scanning sectional views) of multi-beam scanning optical systems of fifth, sixth, and seventh and eighth embodiments, respectively. In FIGS. 9, 10 and 11, elements identical with those shown in FIGS. 1, 3 and 6 are denoted by the same reference symbols.

Note that the fifth, sixth, seventh and eighth embodiments correspond to the first, second, third and fourth embodiments, respectively. The respective fifth, sixth, seventh and eighth embodiments are commonly different from the first, second, third and fourth embodiments in that it is configured without using the BD slit 9 in order to realize simplification and cost reduction of the entire apparatus. The other elements and optical actions are substantially the same as the corresponding first, second, third and fourth embodiments. Consequently, the fifth, sixth, seventh and eighth embodiments realize similar effects.

That is, in each of the fifth, sixth, seventh and eighth embodiments, an effective end of the BD sensor 10 performs actions equivalent to the BD slit 9 in each of the corresponding first, second, third and fourth embodiments. Thus, each of the fifth, sixth, seventh and eighth embodiments implements what each of the corresponding first, second, third and fourth embodiments does with the BD slit 9 surface replaced with a light-receiving surface of the BD sensor 10. Consequently, these embodiments realize effects similar to the corresponding embodiments.

As described above, each of the fifth, sixth, seventh and eighth embodiments is configured without using the BD slit and the BD condensing lens, thereby realizing high-speed and high-quality printing by a relatively simple structure while realizing simplification and cost reduction of the entire apparatus.

Ninth Embodiment

Figure 12:
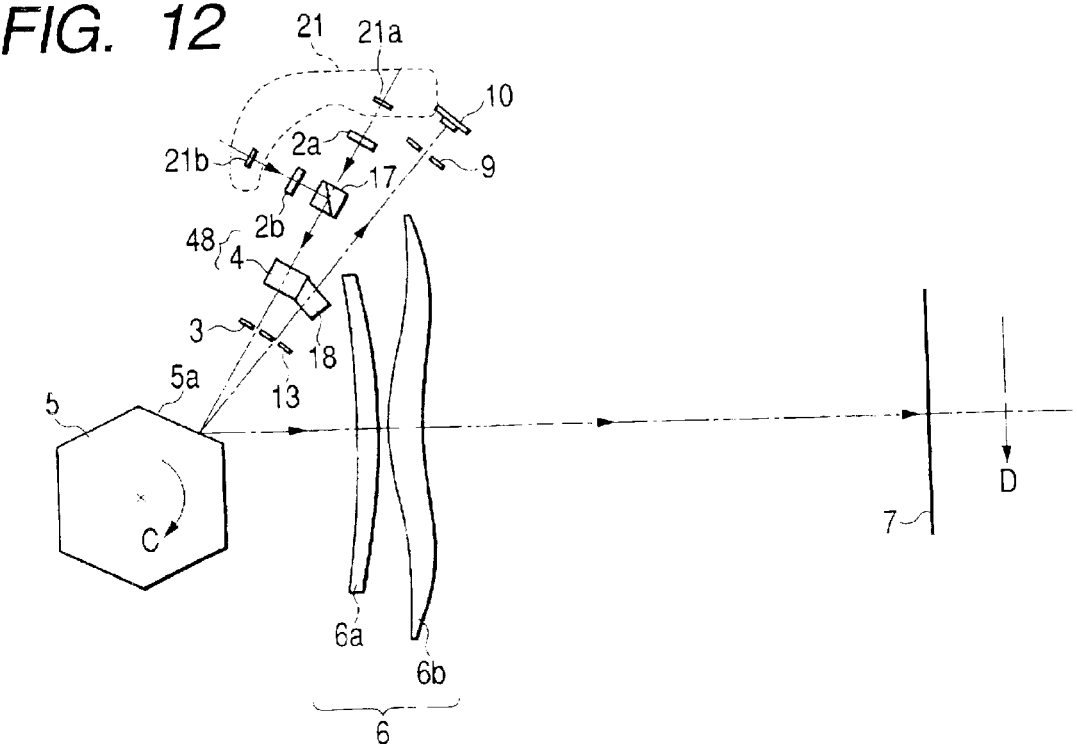
FIG. 12 is a main scanning sectional view of a ninth embodiment of the present invention.

FIG. 12 is a main part sectional view in a main scanning direction (main scanning sectional view) of a multi-beam scanning optical system of a ninth embodiment of the present invention. In the figure, elements identical with those shown in FIG. 3 are denoted by the same reference symbols.

This embodiment is different from the second embodiment in that two light-emitting portions 21a and 21b constituting a light source unit 21 are provided independently from each other, and light beams emitted from the two light-emitting portions 21a and 21b are projected in substantially an identical direction by light beam compositing means 17 through corresponding collimator lenses 2a and 2b. The other elements and optical actions are substantially the same as the second embodiment. Consequently, the ninth embodiment realizes similar effects.

That is, in the figure, reference numeral 21 denotes a light source unit, which has the two light-emitting portions 21a and 21b that are independent from each other. Reference symbols 2a and 2b denote collimator lenses, respectively, which are provided in association with the two light-emitting portions 21a and 21b. Reference numeral 17 denotes light beam compositing means, which consists of, for example, a composite prism and projects light beams emitted from the two light-emitting portions 21a and 21b in substantially an identical direction.

In this embodiment, a deflection point of a light beam from each light-emitting portion on a deflection surface is made uniform by arranging the light beams to pass an identical path from the viewpoint of designing with respect to the main scanning direction, whereby a main scanning dot deviation due to deviation of a focus position described above is reduced.

Moreover, not only the BD stop 13 is provided so as to reduce main scanning dot deviation due to deviation of a focus position even if assembling positions of the two light-emitting portions 21a and 21b, the light beam compositing means 17 and the like are out of position or deviate due to an environmental change, but also the aperture stop 3 is disposed as close as possible to the light deflector 5 side. It is needless to mention that, even if the light beams are not arranged to pass an identical path from the beginning with respect to the main scanning direction, similar effects can be realized by disposing the aperture stop 3 and the BD stop 13 in the positions as shown in FIG. 12.

In addition, in an optical system in which a stop is provided for each light-emitting portion, even if intended or unintended deviation of a deflection point exists between the respective light-emitting portions, deviation of a writing position can also be reduced by disposing the BD stop 13 as in this embodiment.

Tenth Embodiment

Figure 13:
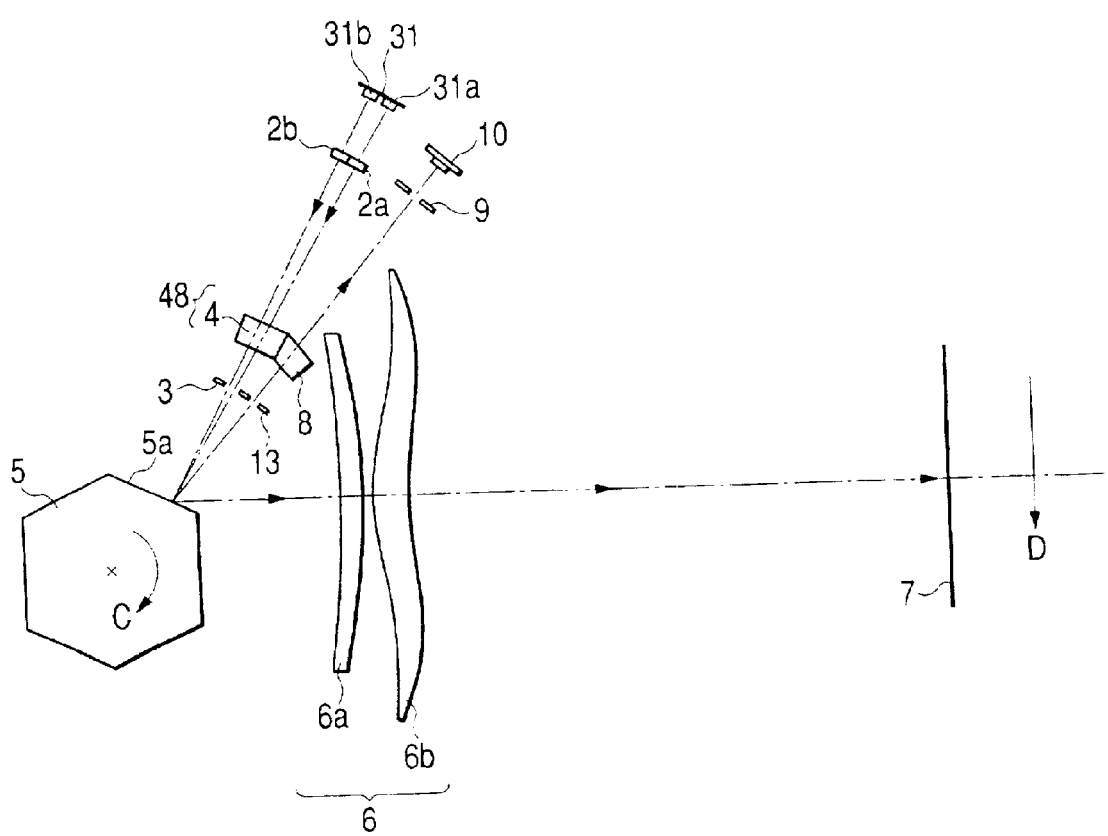
FIG. 13 is a main scanning sectional view of a tenth embodiment of the present invention.

FIG. 13 is a main part sectional view in a main scanning direction (main scanning sectional view) of a multi-beam scanning optical system of a tenth embodiment of the present invention. In the figure, elements identical with those shown in FIG. 12 are denoted by the same reference symbols.

This embodiment is different from the ninth embodiment in that light beams, which are emitted from light-emitting portions 31a and 31b independent from each other and transmitted via collimator lenses 2a and 2b provided for each of the light-emitting portions 31a and 31b, are projected so as to have a substantially equal deflection point without the use of light beam compositing means. The other elements and optical actions are substantially the same as the ninth embodiment. Consequently, the tenth embodiment realizes similar effects.

That is, in this embodiment, the light-emitting portions 31a and 31b are arranged such that a deflection point of a light beam emitted from each of the light-emitting portions 31a and 31b becomes substantially uniform, whereby main scanning dot deviation due to deviation of a focus position is reduced.

Moreover, as in the ninth embodiment, not only the BD stop 13 is provided so as to reduce main scanning dot deviation due to deviation of a focus position even if assembling positions of the respective light-emitting portions 31a and 31b and the like are out of position or deviate due to an environmental change, but also the aperture stop 3 is disposed as close as possible to the light deflector 5 side. It is needless to mention that, even if optical elements are arranged from the beginning such that deflection point positions do not become uniform with respect to the main scanning direction, similar effects can be realized by disposing the aperture stop 3 and the BD stop 13 in the positions as shown in the figure. In addition, in an optical system in which a stop is provided for each of the light-emitting portions 31a and 31b, even if intended or unintended deviation of a deflection point exists between the respective light-emitting portions, deviation of a writing position can also be reduced by disposing the BD stop 13 as in this embodiment.

Note that the light source unit of the above-mentioned ninth and tenth embodiments may be applied not only to the second embodiment but also to the other embodiments.

In the above-mentioned each embodiment, light beams emitted from a light source unit are converted to substantially parallel light beams by collimator lenses. However, the present invention is not limited to this, and the effects of the present invention can be sufficiently obtained by converting light beams into convergent light beams or divergent light beams.

In addition, the above-mentioned each embodiment is described with the multi-beam scanning apparatus for emitting two light beams as an example. However, the present invention is not limited to this, and the effects of the present invention can be obtained in a multi-beam scanning apparatus using three or more light beams as in the above-mentioned each embodiment.

Note that, in the above-mentioned each embodiment, the scanning optical means is constituted by two lenses. However, the present invention is not limited to this, and the scanning optical means may be constituted by, for example, single or three or more lenses. In addition, the scanning optical means is not limited to a refractive element, but may contain a diffraction element having a diffractive action.

Image Forming Apparatus

Figure 14:
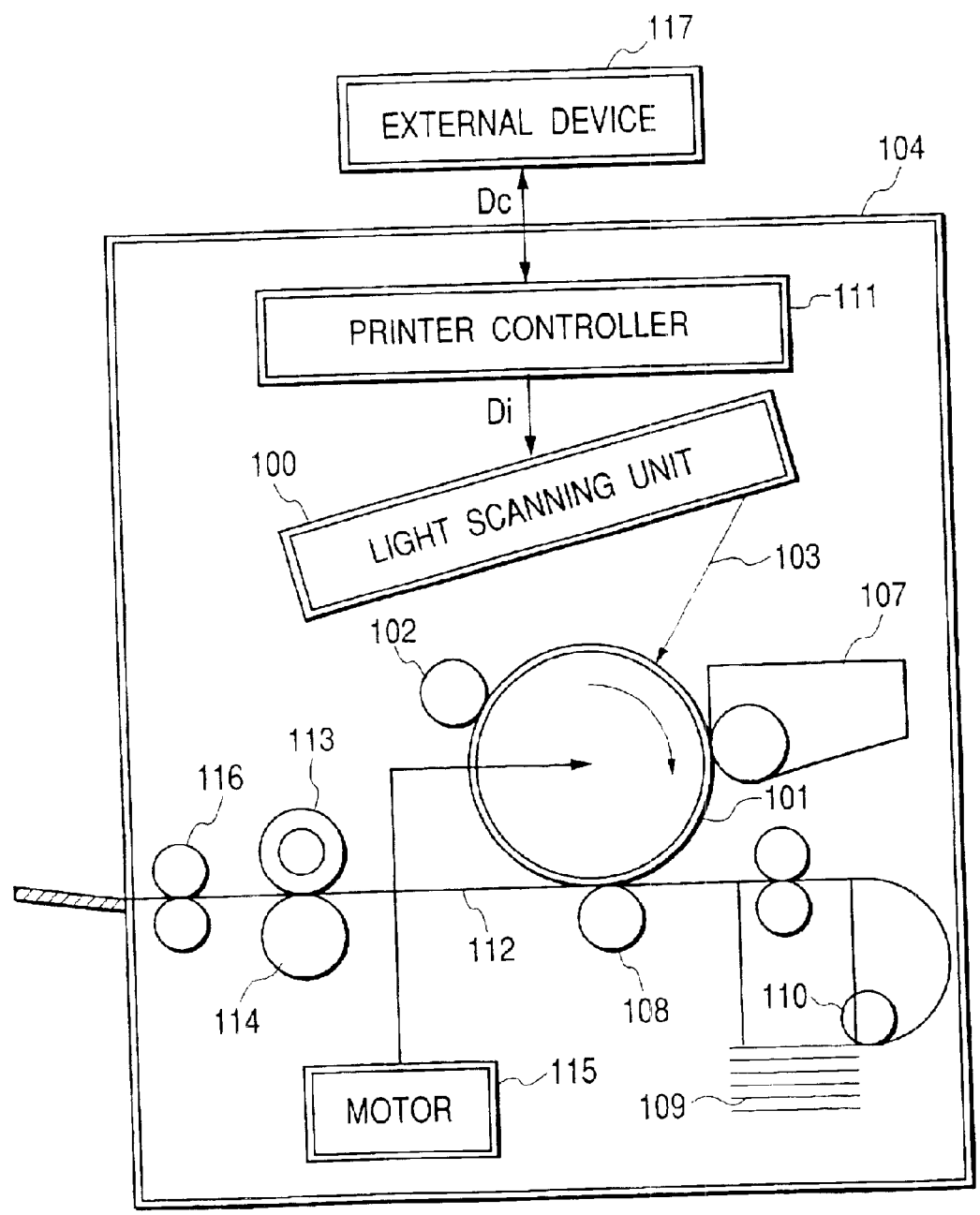
FIG. 14 is a sub scanning sectional view showing an example of a structure of an image forming apparatus (electrophotographic printer) using a multi-beam scanning optical system of the present invention.

FIG. 14 is a main part sectional view within a sub scanning cross section showing an embodiment of an image forming apparatus (electrophotographic printer) using the multi-beam scanning optical system of any one of the above-mentioned first to tenth embodiments. In FIG. 14, reference numeral 104 denotes an image forming apparatus. Code data Dc is inputted in this image forming apparatus 104 from an external device 117 such as a personal computer. This code data Dc is converted into image data (dot data) Di by a printer controller 111 in the apparatus. This image data Di is inputted in an optical scanning unit 100 having the structure shown in each of the first to tenth embodiments. Then, a light beam 103 modulated according to the image data Di is emitted from this optical scanning unit (multi-beam scanning optical system) 100, and a photosensitive surface of a photosensitive drum 101 is scanned in a main scanning direction by this light beam 103.

The photosensitive drum 101 functioning as an electrostatic latent image bearing member (photosensitive member) is rotated clockwise by a motor 115. Then, the photosensitive surface of the photosensitive drum 101 moves in a sub scanning direction perpendicular to the main scanning direction with respect to the light beam 103 following this rotation. A charging roller 102 for charging the surface of the photosensitive drum 101 uniformly is provided above the photosensitive drum 101 so as to abut the surface. Then, the light beam 103 to be scanned by the optical scanning unit 100 is irradiated on the surface of the photosensitive drum 101 charged by the charging roller 102.

As described above, the light beam 103 is modulated based on the image data Di. An electrostatic latent image is formed on the surface of the photosensitive drum 101 by irradiating this light beam 103. This electrostatic latent image is developed as a toner image by a developing device 107 that is arranged to abut the photosensitive drum 101 on the downstream side of an irradiating position of the light beam 103 within a rotation cross section of the photosensitive drum 101 than.

The toner image developed by the developing device 107 is transferred onto a sheet 112, which is a transferring material, below the photosensitive drum 101 by a transferring roller (transferring device) 108 arranged to oppose the photosensitive drum 101. The sheet 112 is contained in a sheet cassette 109 in front (on the right side in FIG. 14) of the photosensitive drum 101. The sheet 112 can also be manually fed. A sheet feeding roller 110 is arranged at the end of the sheet cassette 109 and delivers the sheet 112 in the sheet cassette 109 to a conveying path.

In this way, the sheet 112 having the unfixed toner image transferred thereon is further conveyed to a fixing device behind (on the left side in FIG. 14) the photosensitive drum 101. The fixing device is constituted by a fixing roller 113 having a fixing heater (not shown) in its inside and a pressurizing roller 114 arranged to be brought into pressed contact with this fixing roller 113. The fixing roller fixes the unfixed toner image on the sheet 112 by heating the sheet 112 conveyed from a transfer member while pressurizing it in a press contact portion the fixing roller 113 and the pressurizing roller 114. Moreover, a sheet discharging roller 116 is arranged behind the fixing roller 113 and discharges the sheet 112 having the toner image fixed thereon to the outside of the image forming apparatus.

Although not shown in FIG. 14, the printer controller 111 performs not only data conversion described above but also control of each portion such as the motor 115 in the image forming apparatus and a polygon motor and the like in the optical scanning unit 100.

According to the present invention, relative deviation of a writing position of each light beam due to deviation of a focus position within a main scanning cross section of light beams guided by a BD sensor viewed from a BD slit (a light-receiving surface of a BD sensor if the BD slit is not provided) is reduced using a light beam limiting element (BD stop) as described above. Consequently, a multi-beam scanning optical system and an image forming apparatus using the same, which can realize high-speed and high-quality printing, can be attained.

What is claimed is:

1. A multi-beam scanning optical system comprising:

light source means;

incident optical means for guiding a plurality of light beams emitted from said light source means to deflection means;

scanning optical means for imaging the plurality of light beams deflected by said deflection means on a surface to be scanned; and synchronization detection optical means in which the plurality of light beams deflected by said deflection means are condensed on a slit surface of a slit or a vicinity thereof by an optical element and then guided to a synchronization detection element, and timing of a scanning start on the surface to be scanned is controlled with respect to the plurality of light beams by using a signal from said synchronization detection element, wherein a first light beam limiting element is provided between said deflection means and said optical element closest to said deflection means, and wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$.

2. A multi-beam scanning optical system comprising:

light source means;

incident optical means for guiding a plurality of light beams emitted from said light source means to deflection means;

scanning optical means for imaging the plurality of light beams deflected by said deflection means on a surface to be scanned; and synchronization detection optical means in which the plurality of light beams deflected by said deflection means are condensed on a slit surface of a slit or a vicinity thereof by an optical element and then guided to a synchronization detection element, and timing of a scanning start on the surface to be scanned is controlled with respect to the plurality of light beams by using a signal from said synchronization detection element, wherein a first light beam limiting element is provided between said optical element closest to said synchronization detection element and said slit and wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$.

3. A multi-beam scanning optical system comprising:

light source means;

incident optical means for guiding a plurality of light beams emitted from said light source means to deflection means;

scanning optical means for imaging the plurality of light beams deflected by said deflection means on a surface to be scanned; and synchronization detection optical means in which the plurality of light beams deflected by said deflection means are condensed on a slit surface of a slit or a vicinity thereof by an optical element and then guided to a synchronization detection element, and timing of a scanning start on the surface to be scanned is controlled with respect to the plurality of light beams by using a signal from said synchronization detection element, wherein a first light beam limiting element is provided between said deflection means and said slit, wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$; and wherein said first light beam limiting element and said second light beam limiting element are integrally provided.

4. A multi-beam scanning optical system according to any one of claims 1 to 3, wherein said optical element is a member comprising said scanning optical means.

5. An image forming apparatus according to claim 4, further comprising:

a photosensitive member disposed on a surface to be scanned;

a developing device for developing an electrostatic latent image formed on said photosensitive member by a light beam scanned by said multi-beam scanning optical system as a toner image;

a transferring device for transferring the developed toner image onto a transferring material; and a fixing device for fixing the transferred toner image on the transferring material.

6. An image forming apparatus according to claim 4, further comprising a printer controller for converting code data inputted from external equipment into an image signal and inputting the signal in said multi-beam scanning optical system.

7. A multi-beam scanning optical system comprising:

light source means;

incident optical means for guiding a plurality of light beams emitted from said light source means to deflection means;

scanning optical means for imaging the plurality of light beams deflected by said deflection means on a surface to be scanned; and synchronization detection optical means in which the plurality of light beams deflected by said deflection means are condensed on a slit surface of a slit or a vicinity thereof by an optical element provided optically independently from said scanning optical means and then guided to a synchronization detection element, and timing of a scanning start on the surface to be scanned is controlled with respect to the plurality of light beams by using a signal from said synchronization detection element, wherein a first light beam limiting element is provided between said deflection means and said optical element closest to said deflection means; and wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$.

8. A multi-beam scanning optical system comprising:
light source means;
incident optical means for guiding a plurality of light beams emitted from said light source means to deflection means;
scanning optical means for imaging the plurality of light beams deflected by said deflection means on a surface to be scanned; and
synchronization detection optical means in which the plurality of light beams deflected by said deflection means are condensed on a slit surface of a slit or a vicinity thereof by an optical element provided optically independently from said scanning optical means and then guided to a synchronization detection element, and timing of a scanning start on the surface to be scanned is controlled with respect to the plurality of light beams by using a signal from said synchronization detection element,
wherein a first light beam limiting element is provided between said optical element closest to said synchronization detection element and said slit, and
wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$.

9. A multi-beam scanning optical system comprising:
light source means;
incident optical means for guiding a plurality of light beams emitted from said light source means to deflection means;
scanning optical means for imaging the plurality of light beams deflected by said deflection means on a surface to be scanned; and
synchronization detection optical means in which the plurality of light beams deflected by said deflection means are condensed on a slit surface of a slit or a vicinity thereof by an optical element provided optically independently from said scanning optical means and then guided to a synchronization detection element, and timing of a scanning start on the surface to be scanned is controlled with respect to the plurality of light beams by using a signal from said synchronization detection element,
wherein a first light beam limiting element is provided between said deflection means and said slit;

wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$; and wherein said first light beam limiting element and said second light beam, limiting element are integrally provided.

10. A multi-beam scanning optical system comprising:
light source means;
incident optical means for guiding a plurality of light beams emitted from said light source means to deflection means;
scanning optical means for imaging the plurality of light beams deflected by said deflection means on a surface to be scanned; and
synchronization detection optical means in which the plurality of light beams deflected by said deflection means are condensed on a light-receiving surface of a synchronization detection element or a vicinity thereof by an optical element and timing of a scanning start on the surface to be scanned is controlled with respect to the plurality of light beams by using a signal from said synchronization detection element,
wherein a first light beam limiting element is provided between said deflection means and said optical element closest to said deflection means, and
wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$.

11. A multi-beam scanning optical system comprising:
light source means;
incident optical means for guiding a plurality of light beams emitted from said light source means to deflection means;
scanning optical means for imaging the plurality of light beams deflected by said deflection means on a surface to be scanned; and
synchronization detection optical means in which the plurality of light beams deflected by said deflection means are condensed on a light-receiving surface of a synchronization detection element or a vicinity thereof by an optical element and timing of a scanning start on the surface to be scanned is controlled with respect to the plurality of light beams by using a signal from said synchronization detection element,
wherein a first light beam limiting element is provided between said light-receiving surface of said synchronization detection element and said optical element closest to said deflection means, and
wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$.

12. A multi-beam scanning optical system comprising:
light source means;
incident optical means for guiding a plurality of light beams emitted from said light source means to deflection means;
scanning optical means for imaging the plurality of light beams deflected by said deflection means on a surface to be scanned; and
synchronization detection optical means in which the plurality of light beams deflected by said deflection means are condensed on a light-receiving surface of a synchronization detection element or a vicinity thereof by an optical element and timing of a scanning start on the surface to be scanned is controlled with respect to the plurality of light beams by using a signal from said synchronization detection element,
wherein a first light beam limiting element is provided between said deflection means and said light-receiving surface of said synchronization detection element,
wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$; and
wherein said first light beam limiting element and said second light beam limiting element are integrally provided.

13. A multi-beam scanning optical system according to any one of claims 10 to 12, wherein said optical element is a member comprising said scanning optical means.

14. An image forming apparatus according to claim 13, further comprising:
a photosensitive member disposed on a surface to be scanned;
a developing device for developing an electrostatic latent image formed on said photosensitive member by a light beam scanned by said multi-beam scanning optical system as a toner image;
a transferring device for transferring the developed toner image onto a transferring material; and
a fixing device for fixing the transferred toner image on the transferring material.

15. An image forming apparatus according to claim 13, further comprising a printer controller for converting code data inputted from external equipment into an image signal and inputting the signal in said multi-beam scanning optical system.

16. A multi-beam scanning optical system comprising:
light source means;
incident optical means for guiding a plurality of light beams emitted from said light source means to deflection means;
scanning optical means for imaging the plurality of light beams deflected by said deflection means on a surface to be scanned; and
synchronization detection optical means in which the plurality of light beams deflected by said deflection means are condensed on a light-receiving surface of a synchronization detection element or a vicinity thereof by an optical element provided optically independently from said scanning optical means, and timing of a scanning start on the surface to be scanned is controlled with respect to the plurality of light beams by using a signal from said synchronization detection element,
wherein a first light beam limiting element is provided between said deflection means and said optical element closest to said deflection means, and
wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$.

17. A multi-beam scanning optical system comprising:
light source means;
incident optical means for guiding a plurality of light beams emitted from said light source means to deflection means;
scanning optical means for imaging the plurality of light beams deflected by said deflection means on a surface to be scanned; and
synchronization detection optical means in which the plurality of light beams deflected by said deflection means are condensed on a light-receiving surface of a synchronization detection element or a vicinity thereof by an optical element provided optically independently from said scanning optical means, and timing of a scanning start on the surface to be scanned is controlled with respect to the plurality of light beams by using a signal from said synchronization detection element,
wherein a first light beam limiting element is provided between said light-receiving surface of said synchronization detection element and said optical element closest to said deflection means, and
wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leq 0.003$.

18. A multi-beam scanning optical system comprising:
light source means;
incident optical means for guiding a plurality of light beams emitted from said light source means to deflection means;
scanning optical means for imaging the plurality of light beams deflected by said deflection means on a surface to be scanned; and synchronization detection optical means in which the plurality of light beams deflected by said deflection means are condensed on a light-receiving surface of a synchronization detection element or a vicinity thereof by an optical element provided optically independently from said scanning optical means, and timing of a scanning start on the surface to be scanned is controlled with respect to the plurality of light beams by using a signal from said synchronization detection element, wherein a first light beam limiting element is provided between said deflection means and said light-receiving surface of said synchronization detection element, wherein said incident optical means has a second light beam limiting element and, given that a distance from said second light beam limiting element to a deflection point on said deflection means is d [mm], a maximum value of a distance in a main scanning direction between light-emitting portions of the plurality of light beams is w [mm], a focal length within a main scanning cross section of said incident optical means is fn [mm], and a focal length within a main scanning cross of said scanning optical means is fs [mm], the system satisfies a conditional expression $(d \cdot w)/(fn \cdot fs) \leqq 0.003$; and wherein said first light beam limiting element and said second light beam limiting element are integrally provided.

19. An image forming apparatus according to any one of claims 1, 2, 3, 7, 8, 9, 10, 11, 12, 16, 17, 18, further comprising:

a photosensitive member disposed on the surface to be scanned;

a developing device for developing an electrostatic latent image formed on said photosensitive member by a light beam scanned by said multi-beam scanning optical system as a toner image;

a transferring device for transferring the developed toner image onto a transferring material; and a fixing device for fixing the transferred toner image on the transferring material.

20. An image forming apparatus according to any one of claims 1, 2, 3, 7, 8, 9, 10, 11, 12, 16, 17, 18, further comprising a printer controller for converting code data inputted from external equipment into an image signal and inputting the signal in said multi-beam scanning optical system.

* * * * *

UNITED STATES PATENT AND TRADEMARK OFFICE
CERTIFICATE OF CORRECTION

PATENT NO. : 6,914,620 B2
DATED : July 5, 2005
INVENTOR(S) : Hiroki Yoshida et al.

It is certified that error appears in the above-identified patent and that said Letters Patent is hereby corrected as shown below:

Column 20,
Line 28, "101 than." should read -- 101. --.

Column 21,
Lines 31 and 61, "$(d \cdot w)/(fn \cdot fs) \leq 0.003$." should read -- $(d \cdot w)/(fn \cdot fs) < 0.003$. --.

Column 22,
Line 24, "$(d \cdot w)/(fn \cdot fs) \leq 0.003$;" should read -- $(d \cdot w)/(fn \cdot fs) < 0.003$; --.

Column 23,
Lines 14 and 46, "$(d \cdot w)/(fn \cdot fs) \leq 0.003$." should read -- $(d \cdot w)/(fn \cdot fs) < 0.003$. --.

Column 24,
Line 11, "$(d \cdot w)/(fn \cdot fs) \leq 0.003$;" should read -- $(d \cdot w)/(fn \cdot fs) < 0.003$; --; and
Line 44, "$(d \cdot w)/(fn \cdot fs) \leq 0.003$." should read -- $(d \cdot w)/(fn \cdot fs) < 0.003$. --.

Column 25,
Line 9, "$(d \cdot w)/(fn \cdot fs) \leq 0.003$." should read -- $(d \cdot w)/(fn \cdot fs) < 0.003$. --; and
Line 38, "$(d \cdot w)/(fn \cdot fs) \leq 0.003$;" should read -- $(d \cdot w)/(fn \cdot fs) < 0.003$; --.

Column 26,
Lines 26 and 58, "$(d \cdot w)/(fn \cdot fs) \leq 0.003$." should read -- $(d \cdot w)/(fn \cdot fs) < 0.003$. --.

Column 27,
Line 23, "$(d \cdot w)/(fn \cdot fs) \leq 0.003$;" should read -- $(d \cdot w)/(fn \cdot fs) < 0.003$; --.

Signed and Sealed this

Eighth Day of November, 2005

JON W. DUDAS
*Director of the United States Patent and Trademark Office*